(12) United States Patent
Carrow et al.

(10) Patent No.: US 11,794,180 B2
(45) Date of Patent: *Oct. 24, 2023

(54) TRI-(ADAMANTYL)PHOSPHINES AND APPLICATIONS THEREOF

(71) Applicant: The Trustees of Princeton University, Princeton, NJ (US)

(72) Inventors: Brad P. Carrow, Princeton, NJ (US); Liye Chen, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,196

(22) Filed: Jan. 23, 2023

(65) Prior Publication Data

US 2023/0158480 A1  May 25, 2023

Related U.S. Application Data

(62) Division of application No. 17/167,606, filed on Feb. 4, 2021, now Pat. No. 11,583,844, which is a division
(Continued)

(51) Int. Cl.
*B01J 31/24* (2006.01)
*C07F 9/50* (2006.01)
(Continued)

(52) U.S. Cl.
CPC ....... *B01J 31/2485* (2013.01); *B01J 31/2208* (2013.01); *B01J 31/2295* (2013.01); *B01J 31/2447* (2013.01); *C07B 37/04* (2013.01); *C07F 9/5018* (2013.01); *C07F 9/5045* (2013.01); *C07F 15/0006* (2013.01); *C07F 15/006* (2013.01); *C07F 15/0066* (2013.01); *C07F 15/0073* (2013.01); *B01J 2231/14* (2013.01); *B01J 2231/4205* (2013.01); *B01J 2231/4211* (2013.01); *B01J 2231/4227* (2013.01); *B01J 2231/4233* (2013.01); *B01J 2231/4261* (2013.01); *B01J 2231/4272* (2013.01); *B01J 2231/4283* (2013.01); *B01J 2531/0205* (2013.01); *B01J 2531/0288* (2013.01); *B01J 2531/822* (2013.01); *B01J 2531/824* (2013.01); *B01J 2540/442* (2013.01); *C07F 1/00* (2013.01); *C07F 3/00* (2013.01)

(58) Field of Classification Search
None
See application file for complete search history.

(56) References Cited

U.S. PATENT DOCUMENTS

2006/0020148 A1* 1/2006 Maehara ............... C07F 9/5068
568/9

* cited by examiner

*Primary Examiner* — Yun Qian
(74) *Attorney, Agent, or Firm* — J. Clinton Wimbish; Maynard Nexsen PC

(57) ABSTRACT

In one aspect, phosphine compounds comprising three adamantyl moieties (PAd$_3$) and associated synthetic routes are described herein. Each adamantyl moiety may be the same or different. For example, each adamantyl moiety (Ad) attached to the phosphorus atom can be independently selected from the group consisting of adamantane, diamantane, triamantane and derivatives thereof. Transition metal complexes comprising PAd$_3$ ligands are also provided for catalytic synthesis including catalytic cross-coupling reactions.

4 Claims, 13 Drawing Sheets

Related U.S. Application Data of application No. 15/770,709, filed as application No. PCT/US2016/059698 on Oct. 31, 2016, now Pat. No. 10,981,157.

(60) Provisional application No. 62/248,056, filed on Oct. 29, 2015.

(51) Int. Cl.
*C07B 37/04* (2006.01)
*B01J 31/22* (2006.01)
*C07F 15/00* (2006.01)
*C07F 1/00* (2006.01)
*C07F 3/00* (2006.01)

X, Y = Cl, Br, I, η³-allyl, η³-crotyl, η³-cinnamyl, η³-indenyl

R = Me, Ar, heteroaryl, η³-allyl, η³-crotyl, η³-cinnamyl, η³-indenyl (for η³ ligands, X ligand may be coordinated or dissociated as a counter anion)

X = F, Cl, Br, I, OAc, substituted benzoate, TFA, OTs, OMs, OTf

Ar = Ph, substituted phenyl

TRI-(ADAMANTYL)PHOSPHINES AND APPLICATIONS THEREOF

RELATED APPLICATION DATA

The present application is a divisional application pursuant to 35 U.S.C. § 120 of U.S. patent application Ser. No. 17/167,606 filed Feb. 4, 2021, which is a divisional application of U.S. patent application Ser. No. 15/770,709 filed Apr. 24, 2018, now U.S. Pat. No. 10,981,157, which is a U.S. National Phase of PCT/US2016/059698 filed Oct. 31, 2016, which claims priority pursuant to 35 U.S.C. § 119(e) to United States Provisional Patent Application Ser. No. 62/248,056 filed Oct. 29, 2015, each of which is hereby incorporated by reference in its entirety.

FIELD

The present invention relates to phosphine compounds comprising three adamantyl moieties ($PAd_3$) and, in particular, to transition metal complexes incorporating $PAd_3$ ligand for cross-coupling catalysis.

BACKGROUND

Modern synthetic organic methods utilizing homogeneous transition metal catalysis have benefited immensely from the capacity of phosphines to modify the activity, selectivity and stability of metal catalysts. As a corollary, the behavior of metal catalysts can be manipulated by tuning the steric and electronic properties of supporting ligands such as phosphines. Thus, the discovery of novel phosphine structures with steric and/or electronic properties beyond what can be accessed using existing phosphorus-based ancillary ligands is desirable. Newer applications of phosphines to organocatalysis, frustrated Lewis pair (FLP) catalysis, biorthogonal reactions, and nano-materials should also benefit from access to new phosphine properties.

SUMMARY

In one aspect, phosphine compounds comprising three adamantyl moieties ($PAd_3$) and associated synthetic routes are described herein. Each adamantyl moiety may be the same or different. For example, each adamantyl moiety (Ad) attached to the phosphorus atom can be independently selected from the group consisting of adamantane, diamantane, triamantane and derivatives thereof. Therefore, a series of $PAd_3$ compounds are contemplated. In another aspect, a method of synthesizing a $PAd_3$ compound comprises providing a reaction mixture including di-(adamantyl)phosphine ($PAd_2$) and a substituted adamantyl moiety and reacting the $PAd_2$ and substituted adamantyl moiety via an $S_N1$ pathway to provide $PAd_3$. In other embodiments, a method of synthesizing a $PAd_3$ compound comprises providing a reaction mixture including di-(adamantyl)phosphide and a substituted adamantyl moiety and reacting the di-(adamantyl)phosphide and substituted adamantyl moiety via an $S_N1$ pathway to provide $PAd_3$.

In another aspect, metal complexes are provided. A metal complex comprises at least one transition metal and one or more $PAd_3$ ligands described herein coordinated to the transition metal. In some embodiments, a metal complex is of the formula $(PAd_3)_mM(L)_n$ wherein M is the transition metal, L is ligand and m and n are each integers from 1 to 3.

In a further aspect, methods of catalysis are described herein, including catalytic cross-coupling reactions. A method of cross-coupling, in some embodiments, comprises providing a reaction mixture including a substrate, a coupling partner and a transition metal complex comprising $PAd_3$ ligand and reacting the substrate and coupling partner in the presence of the transition metal complex or derivative thereof to provide cross-coupled reaction product. In some embodiments, the substrate can be selected from substituted aromatic compounds or substituted unsaturated aliphatic compounds. Moreover, the coupling partner can comprise a variety of species including, but not limited to, organoboron compounds, organolithium compounds, organozinc compounds, organosilicon compounds, Grignard reagents and/or compounds having labile C—H bonds.

These and other embodiments are further described in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Definitions

The term "alkyl" as used herein, alone or in combination, refers to a straight or branched saturated hydrocarbon group optionally substituted with one or more substituents. For example, an alkyl can be $C_1$-$C_{30}$.

The term "alkenyl" as used herein, alone or in combination, refers to a straight or branched chain hydrocarbon group having at least one carbon-carbon double bond.

The term "aryl" or "arene" as used herein, alone or in combination, refers to an aromatic monocyclic or multicyclic ring system optionally substituted with one or more ring substituents The term "heteroaryl" or "heteroarene" as used herein, alone or in combination, refers to an aromatic monocyclic or multicyclic ring system in which one or more of the ring atoms is an element other than carbon, such as nitrogen, oxygen and/or sulfur.

The term "alkoxy" as used herein, alone or in combination, refers to the moiety RO—, where R is alkyl, alkenyl or aryl defined above.

The term "fluoroalkyl" as used herein refers to an alkyl group defined above wherein one or more hydrogen atoms are replaced by fluorine atoms.

I. PAd$_3$ Compounds

In one aspect, phosphine compounds comprising three adamantyl moieties (PAd$_3$) and associated synthetic routes are described herein. Each adamantyl moiety may be the same or different. For example, each adamantyl moiety (Ad) attached to the phosphorus atom can be independently selected from the group consisting of adamantane, diamantane, triamantane and derivatives thereof. In some embodiments, for example, all the adamantyl moieties (Ad) may be the same. In other embodiments, all adamantyl moieties (Ad) may be different. In further embodiments, two adamantyl moieties (Ad) may be the same while the third adamantyl moiety (Ad) is different. Accordingly, use of the common abbreviation Ad for adamantyl moieties of PAd$_3$ compounds is not to be construed as imparting any structural similarity or difference between the three adamantyl moieties.

Figure 1A:
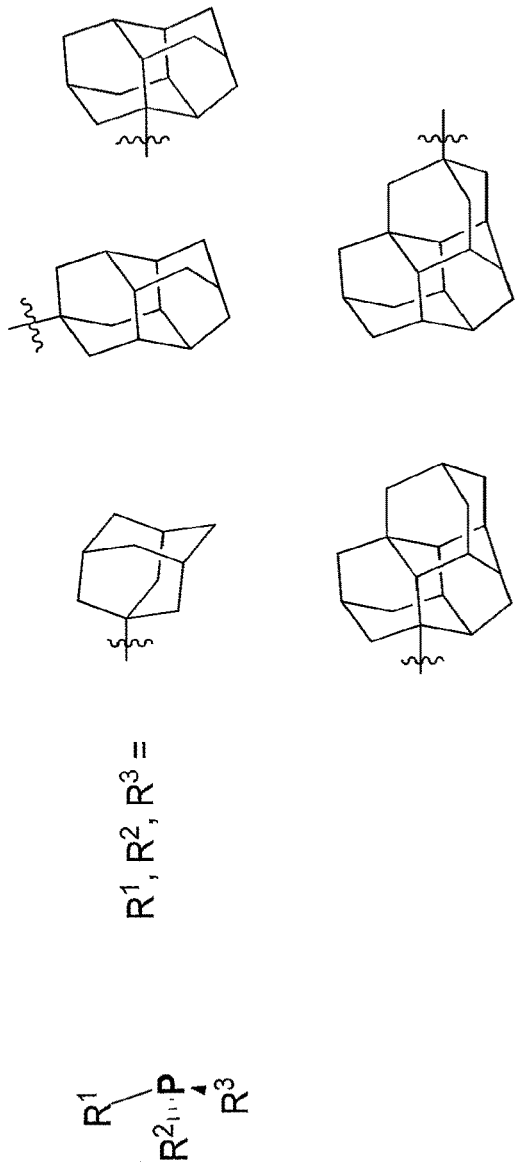
FIG. 1(a) illustrates various $PAd_3$ compounds according to some embodiments.
Figure 1B:
FIG. 1(b) illustrates various salt forms of the $PAd_3$ compounds of FIG. 1(a) according to some embodiments.

FIG. 1(a) illustrates various PAd$_3$ compounds according to some embodiments described herein. As illustrated in FIG. 1, R$^1$, R$^2$ and R$^3$ can be independently selected from several adamantyl moieties (Ad) to provide a series of PAd$_3$ compounds of differing structure. In some embodiments, adamantyl moieties (Ad) of PAd$_3$ compounds are substituted at one or more positions. Adamantyl moieties, for example, can include one or more acyl-, aryl-, alkyl-, alkoxy-, alkylamine and/or alcohol substituents. PAd$_3$ compounds can also exist in salt form as illustrated in FIG. 1(b).

Synthetic routes for PAd$_3$ compounds are also described herein. In one aspect, a method of synthesizing a PAd$_3$ compound comprises providing a reaction mixture including di-(adamantyl)phosphine (PAd$_2$) and a substituted adamantyl moiety and reacting the PAd$_2$ and substituted adamantyl moiety via an S$_N$1 pathway to provide PAd$_3$. Adamantyl moieties of PAd$_2$ can be independently selected from adamantane, diamantane, triamantane and derivatives thereof. Similarly, the substituted adamantyl moiety can have an adamantane, diamantane or triamantane architecture. In one non-limiting embodiment, the PAd$_3$ compound illustrated in structure of formula (I) below is synthesized according to the foregoing method.

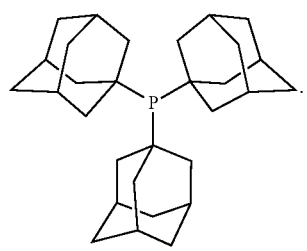

(I)

A reaction mixture including di-1-adamantylphosphine and a substituted adamantane is provided. The di-1-adamantylphosphine and substituted adamantane are reacted via an S$_N$1 pathway to provide tri(1-adamantyl)phosphine. The substituted adamantane, in some embodiments, is of formula (II)

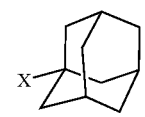

Figure 2:
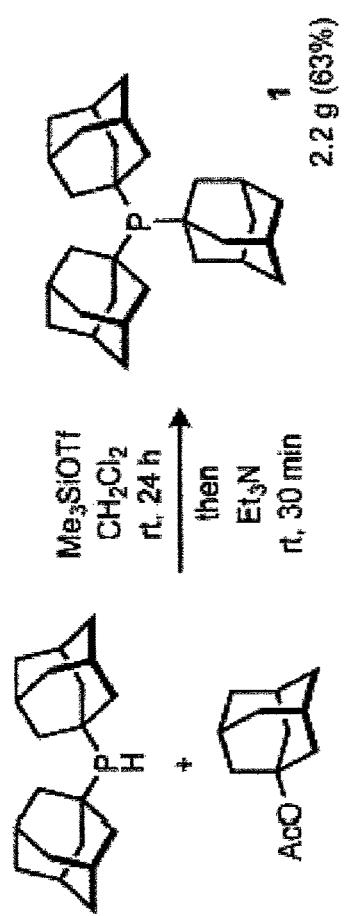
FIG. 2 illustrates synthesis of one embodiment of a $PAd_3$ compound described herein.

(II)

wherein X is a moiety operable for dissociation into an anion under the S$_N$1 pathway. In some embodiments, for example, X is selected from the group consisting of acetate, triflate, tosylate and hydroxyl. FIG. 2 provides specific reaction conditions of the S$_N$1 route for synthesis of the PAd$_3$ compound of formula (I) according to one embodiment. Diamantane and triamantane moieties can also be functionalized with a leaving group to provide substituted adamantane for reaction with PAd$_2$ via an S$_N$1 pathway. The leaving group of these higher adamantane structures can also be selected from the group consisting of acetate, triflate, tosylate and hydroxyl.

In other embodiments, a method of synthesizing PAd$_3$ compounds described herein comprises providing a reaction mixture including di-(adamantyl)phosphide and a substituted adamantyl moiety and reacting the di-(adamantyl)phosphide and substituted adamantyl moiety via an S$_N$1 pathway to provide PAd$_3$. Suitable substituted adamantyl moiety can include a leaving group, X, as described above. Moreover, suitable counterions of the phosphide, in some embodiments, are cations of bases used to deprotonate PAd$_2$ and can include alkali ions, MgCl$^+$ and ZnBr$^+$. Moreover, strong amine bases for which the pKa (H$_2$O) of the amine conjugate acid exceeds approximately 10 may be employed as counterions. Such species can include tertiary ammonium ions It is particularly noted that PAd$_3$ compounds of the present disclosure exhibit significant kinetic stability toward oxidation, thereby permitting storage under air with negligible oxidation. Additionally, synthetic methods described herein can provide PAd$_3$ compounds at yields exceeding 50 percent or 60 percent.

II. Metal Complexes

In another aspect, metal complexes are provided. A metal complex comprises at least one transition metal and one or more PAd3 compounds described in Section I above as ligand coordinated to the transition metal. Any transition metal operable to coordinate with phosphine ligands can be used to provide a metal complex described herein. In some embodiments, the transition metal is selected from Group VIIIA, IB or IIB of the Periodic Table. Groups of the Periodic Table described herein are identified according to the CAS designation. Further, the transition metal can be a noble metal including, but not limited to, palladium, rhodium, silver and gold. In some embodiments, the metal complex comprises two transition metals, wherein $PAd_3$ ligands are coordinated to one or each of the transition metals. Non-$PAd_3$ ligands bridging the transition metal centers can include halo, $\eta^3$-allyl, $\eta^3$-crotyl, $\eta^3$-cinnamyl and $\eta^3$-indenyl.

Figure 3:
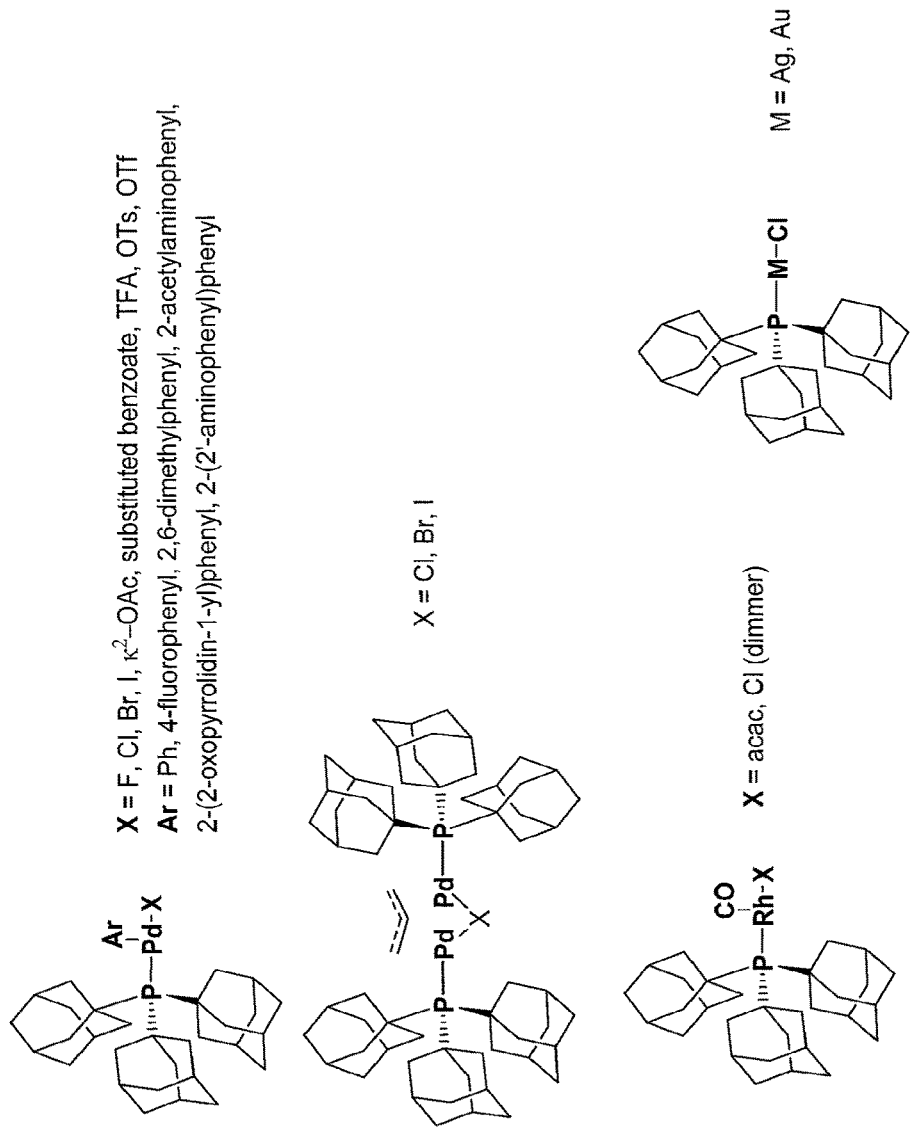
FIG. 3 illustrates several transition metal complexes incorporating $PAd_3$ ligands according to some embodiments.
Figure 4:
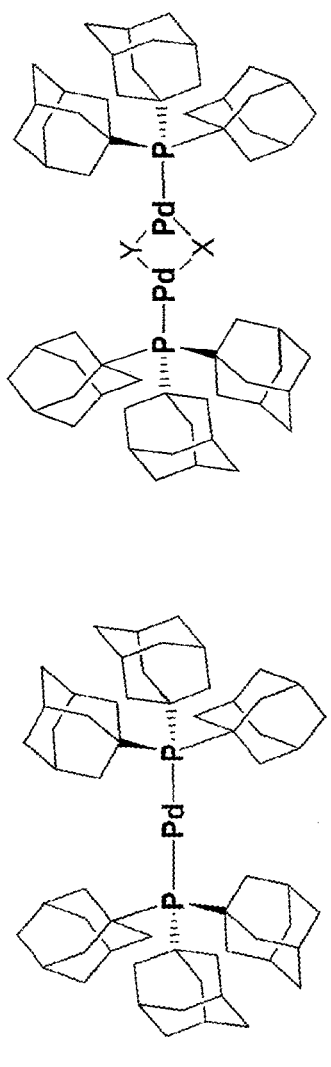
FIG. 4 illustrates several transition metal complexes incorporating $PAd_3$ ligands according to some embodiments.
Figure 4:
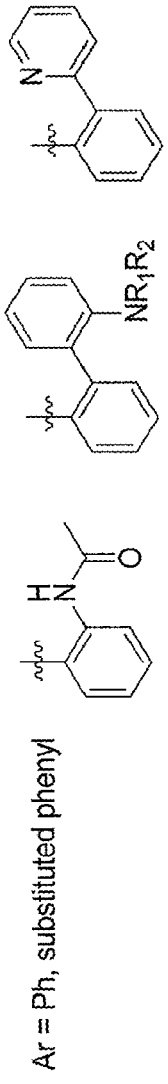

Moreover, the metal complex can be of the formula $(PAd_3)_m M(L)_n$ wherein M is the transition metal, L is ligand and m and n are each integers from 1 to 3. L can generally comprise any species meeting the steric requirements set by the $PAd_3$ ligand(s). In some embodiments, for example, L can be selected from the group consisting of alkyl, aryl, halo, CO, cyano, hydroxyl, acetate, substituted benzoate, trifluoroacetate (TFA), tosylate (OTs), mesylate (OMs), triflate (OTf), $\eta^3$-allyl, $\eta^3$-crotyl, $\eta^3$-cinnamyl and $\eta^3$-indenyl. In embodiments wherein n is greater than 1, the chemical identity of L ligands can be the same or different. FIGS. 3 and 4 illustrate non-limiting examples of metal complexes employing $PAd_3$ ligands described herein. The adamantyl moieties (Ad) of the metal complexes illustrated in FIGS. 3 and 4 are adamantane. It is contemplated that any combination of adamantane, diamantane and/or triamantane moieties can be present in $PAd_3$ ligands of the metal complexes.

III. Catalytic Cross-Coupling

In a further aspect, methods of catalysis are described herein, including catalytic cross-coupling reactions. A method of cross-coupling, in some embodiments, comprises providing a reaction mixture including a substrate, a coupling partner and a transition metal complex comprising PAd3 ligand and reacting the substrate and coupling partner in the presence of the transition metal complex or derivative thereof to provide cross-coupled reaction product. The transition metal complex can have any composition and/or properties described in Section II hereinabove.

Figure 5A:
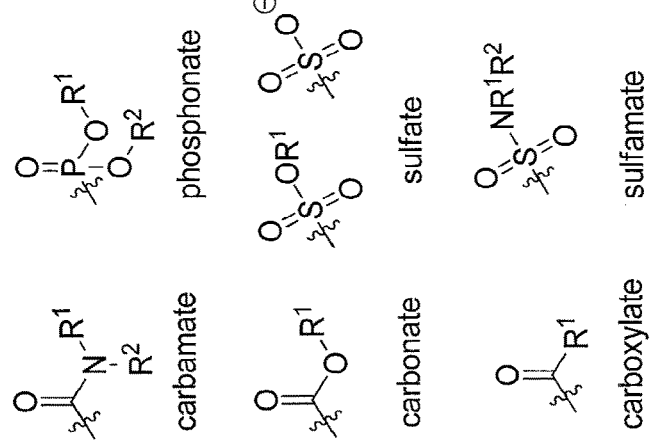
FIG. 5(a) illustrates various phenol leaving groups of aryl substrates according to some embodiments.
Figure 5B:
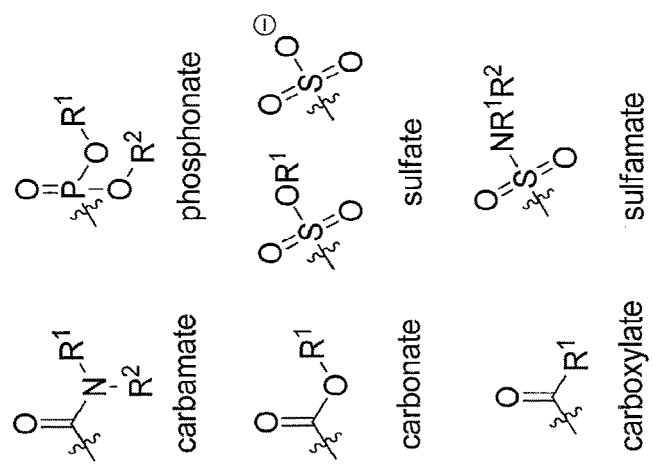
FIG. 5(b) illustrates various thiophenol leaving groups of aryl substrates according to some embodiments.

The substrate can generally be selected from substituted aromatic compounds or substituted unsaturated aliphatic compounds. Suitable substituted aromatic compounds can include monocyclic and multicyclic ring systems, such as fused and non-fused multicyclic ring systems. Substituted aryl compounds can also comprise heteroaryl species, including monocyclic and multicyclic heteroaryl systems. Multicyclic heteroaryl systems can comprise fused and non-fused ring structures such as fused or non-fused heteroaryl rings as well as heteroaryl rings fused or non-fused to aryl rings. A substituted aromatic compound of the reaction mixture comprises a leaving group. Any leaving group operable to undergo cross-coupling mechanistic pathways described herein can be employed. A leaving group, in some embodiments, is selected from the group consisting of halo, tosylate (OTs), mesylate (OMs), nosylate (ONs), $N_2^+X^-$, $N_2NR^1R^2$ and $NMe_3^+$, wherein $X^-$ is halide and $R^1$ and $R^2$ are alkyl. In additional embodiments, a leaving group can be based on phenol derivatives of the aromatic compound including, but not limited to, carbamates, phosphonates, carbonates, sulfates, carboxylates and sulfamates. FIG. 5(a) illustrates various phenol derivative leaving groups according to some embodiments. $R^1$ and $R^2$ in the embodiments of FIG. 5(a) can be alkyl or other suitable aliphatic or substituted aliphatic group. FIG. 5(b) illustrates thiophenol derivative leaving groups, wherein R can be alkyl or other suitable aliphatic or substituted aliphatic group. Aromatic substrates can also comprise one or more ring substituents in addition to the leaving group. As illustrated in the non-limiting embodiments of FIG. 6 and the examples below, aromatic substrates can comprise one or more ring substituents selected from the group consisting of alkyl, cycloalkyl, alkoxy, acyl, nitro, nitrile, hydroxyl and amide.

Substrates of cross-coupling reactions described herein also include substituted unsaturated aliphatic compounds. Substituted unsaturated aliphatic compounds can exhibit a single point of unsaturation, such as in vinyl or allyl compounds. In other embodiments, substituted unsaturated aliphatic compounds can have more than one point of unsaturation. As with aromatic substrates, substituted aliphatic compounds comprise a leaving group. For example, a substituted unsaturated aliphatic compound can comprise any of the leaving groups described above for substituted aromatic compounds. In some embodiments, a leaving group is attached to allyl or vinyl moieties to provide substituted unsaturated aliphatic substrate. In such embodiments, the vinyl or allyl group can include one or more substituents in addition to the leaving group, including alkyl and/or acyl substituents.

The coupling partner of the reaction mixture can comprise a variety of species including, but not limited to, organoboron compounds, organolithium compounds, organozinc compounds, organosilicon compounds and Grignard reagents. Organic moieties of these organometallic compounds can comprise aromatic moieties and aliphatic moieties. Suitable aryl moieties can include monocyclic and multicyclic ring systems, such as fused and non-fused multicyclic ring systems. Aryl moieties can also comprise heteroaryl species, including monocyclic and multicyclic heteroaryl systems. Multicyclic heteroaryl systems can comprise fused and non-fused ring structures such as fused or non-fused heteroaryl rings as well as heteroaryl rings fused or non-fused to aryl rings. In some embodiments, aromatic moieties comprise one or more ring substituents selected from the group consisting of alkyl, cycloalkyl, fluoroalkyl and halo.

Suitable aliphatic moieties of organometallic coupling partners include unsaturated moieties, such as vinyl or allyl groups, as well as saturated moieties. In some embodiments, for example, an unsaturated carbon is coupled to the metal or metalloid of the organometallic compound. In other embodiments, a branch point carbon of a saturated aliphatic moiety is coupled to the metal or metalloid of the organometallic compound. Alternatively, a non-branch point carbon of a saturated aliphatic moiety can be coupled to the metal or metalloid of the organometallic compound.

Figure 7:
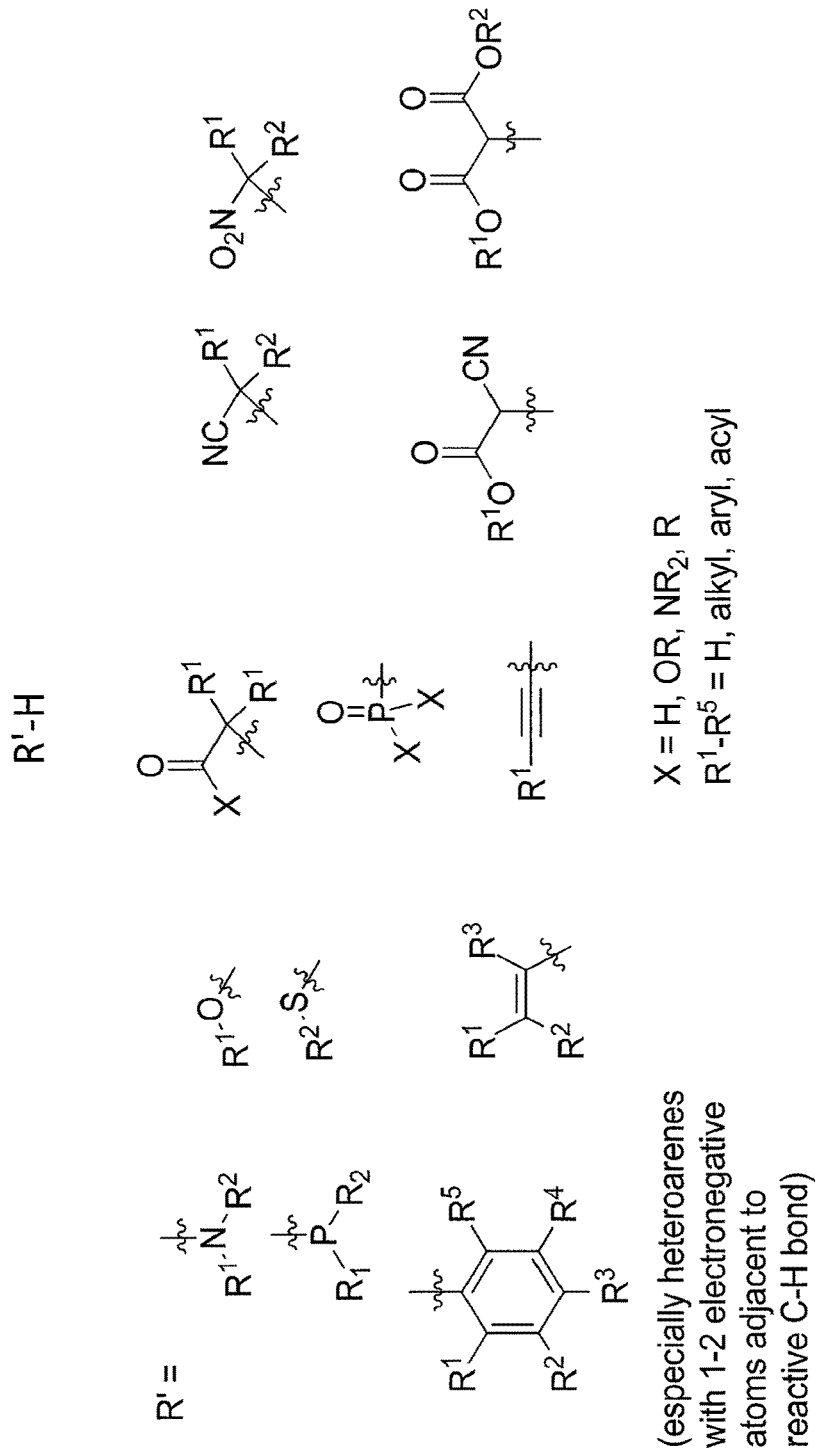
FIG. 7 illustrates coupling partner compounds (R'—H) having reactive C—H bonds according to some embodiments.

In further embodiments, a coupling partner comprises a compound having a labile C—H bond. Compounds having reactive C—H bonds, in some embodiments, comprise amines, phosphines, phosphonates, aliphatic carboxylic acids and esters, aliphatic dicarboxylic acids and esters, ketones, nitriles, nitroalkanes, unsaturated aliphatic compounds and aromatic compounds, including aryl and heteroaryl compounds. Heteroarenes can be especially reactive when one or two electronegative atoms are adjacent to the labile C—H bond. FIG. 7 illustrates various non-limiting embodiments of coupling partner compounds comprising reactive C—H bonds.

Figure 6:
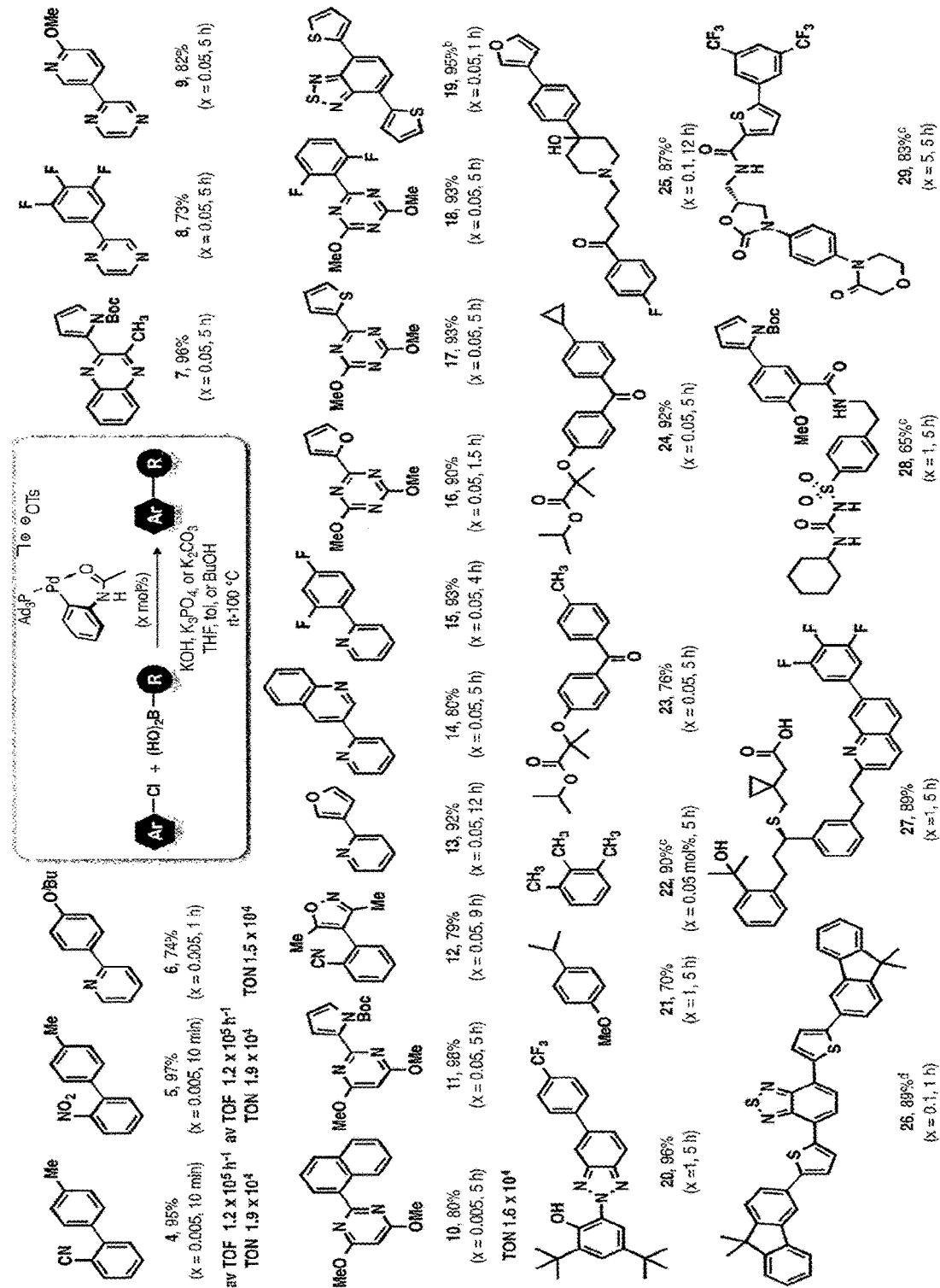
FIG. 6 illustrates Suzuki-Miyaura coupling with transition metal complex described herein according to some embodiments.

When employing organoboron coupling partner, cross-coupling reactions described herein can proceed via Suzuki-Miyaura coupling or Suzuki-Miyaura polycondensation. FIG. 6 illustrates a number of Suzuki-Miyaura couplings employing transition metal complex described herein as catalyst. The cross-couplings illustrated in FIG. 6 are discussed in further detail in the examples below. Table I lists additional catalytic schemes and associated figures employing transition metal catalyst described herein.

TABLE I

Cross Coupling Reactions

Figure 8:
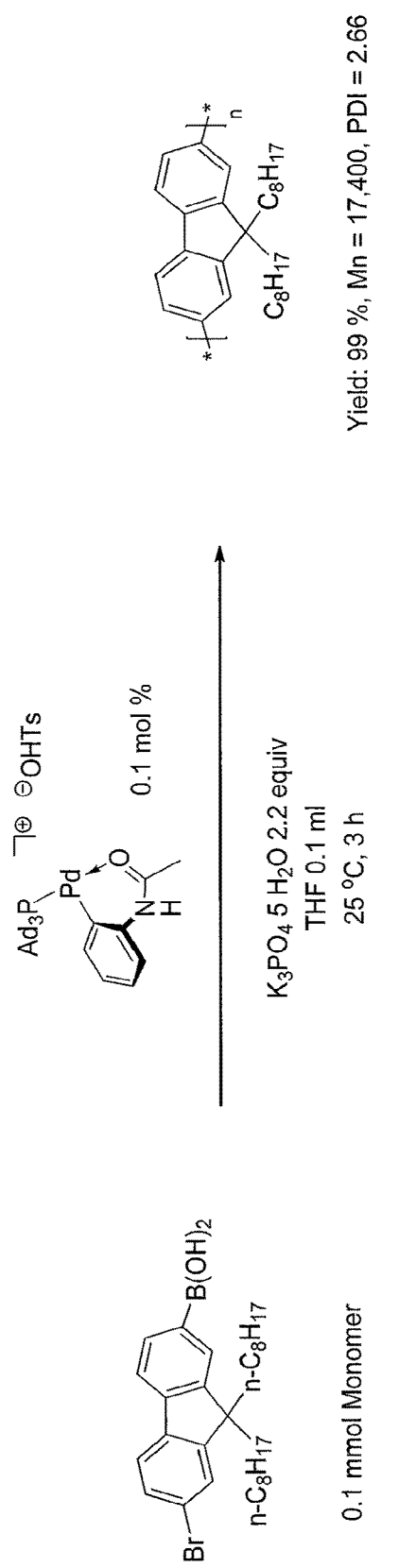
FIG. 8 illustrates Suzuki-Miyaura polymerization with transition metal complex described herein according to some embodiments.
Figure 9:
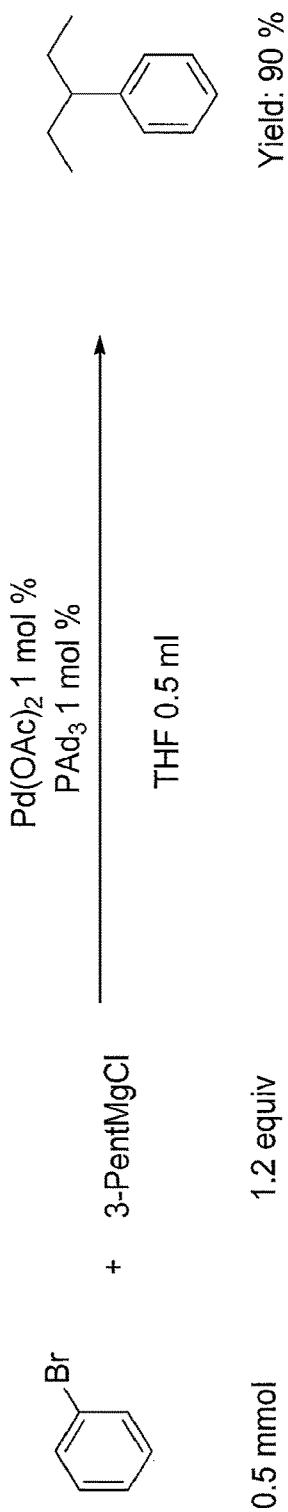
FIG. 9 illustrates Kumada-Tamao-Corriu coupling with transition metal complex described herein according to some embodiments.
Figure 10:
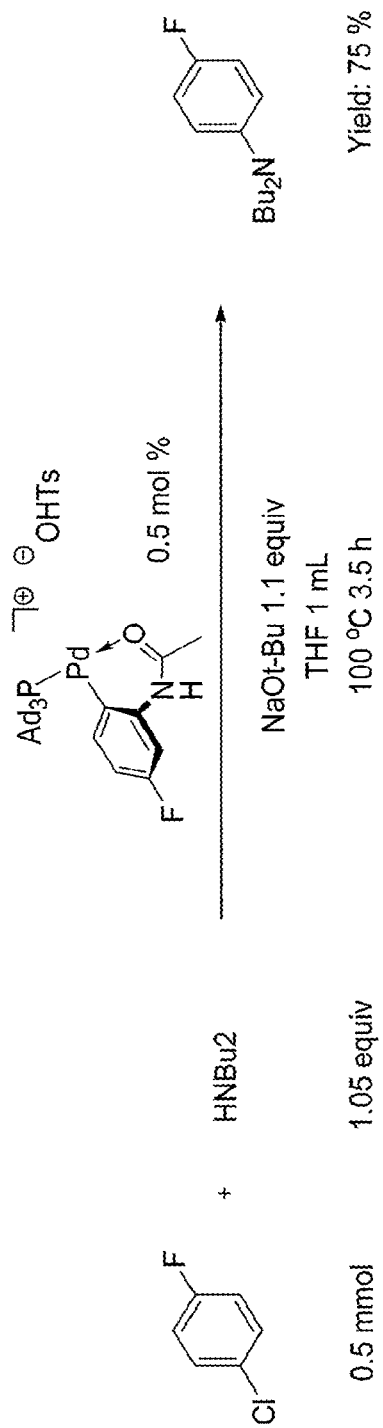
FIG. 10 illustrates Buchwald-Hartwig amination with transition metal complex described herein according to some embodiments.
Figure 11:
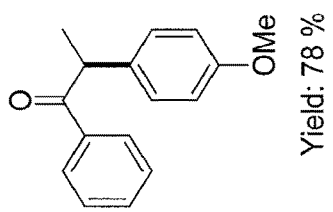
FIG. 11 illustrates a-arylation with transition metal complex described herein according to some embodiments.
Figure 11:
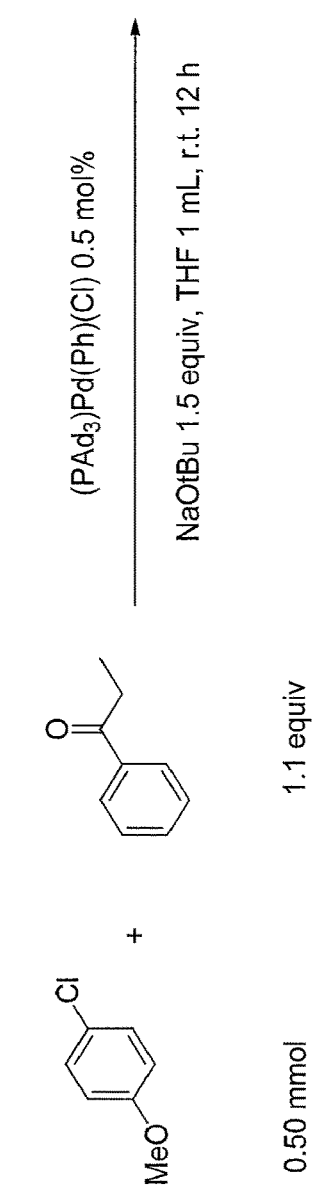

| Coupling Partner | Catalytic Scheme | Example |
|---|---|---|
| 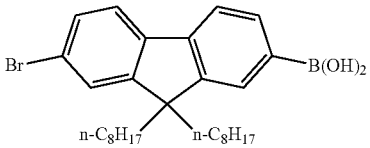 | Suzuki-Miyaura polymerization | FIG. 8 |
| Grignard Reagent (R—Mg—X) | Kumada-Tamao-Corriu coupling | FIG. 9 |
| Alkyl amine/aryl amine | Buchwald-Hartwig amination | FIG. 10 |
| Carbonyl species-ketone, ester, amide, imide | α-arylation | FIG. 11 |

Transition metal complex can be present in the reaction mixture in any amount not inconsistent with objectives of the present invention. Generally, transition metal complex can be present in an amount of 0.005-5 mol %. Transition metal complex can also be present in the reaction mixture in an amount selected from Table II.

TABLE II

| Transition Metal Complex Loading (mol. %) |
|---|
| 0.01-3 |
| 0.01-1 |
| 0.01-0.5 |
| 0.01-0.25 |
| 0.01-0.1 |
| ≤0.5 |
| ≤0.1 |

Figure 12:
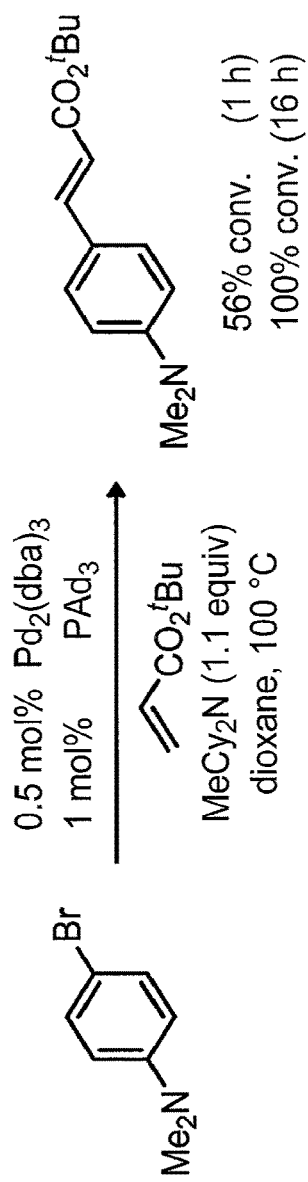
FIG. 12 illustrates cross-coupling with transition metal complex described herein according to some embodiments.

In some embodiments, transition metal complex described herein is formed prior to addition to the reaction mixture. Alternatively, PAd$_3$ ligand and transition metal complex precursor are added to the reaction mixture for in-situ formation of the catalytic transition metal complex or derivative thereof. FIGS. 9 and 12, for example, illustrate addition of PAd$_3$ ligand and transition metal complex precursor to the reaction mixture for catalytic cross-coupling of substrate and coupling partner.

Cross-coupling methods described herein can exhibit product yields greater than 50 percent. In some embodiments, product yield ranges from 60-99 percent. Cross-coupling methods described herein can also exhibit product yields selected from Table III.

TABLE III

| Product Yield (%) |
|---|
| 70-99 |
| 75-99 |
| 80-99 |
| 90-99 |
| 95-99 |
| >90 |

Further, transition metal complex described herein can exhibit high turnover numbers (TON) and high turnover frequencies (TOF). For example, transition metal complex, in some embodiments, displays TON of at least $1.5 \times 10^4$ and TOF of at least $1 \times 10^5$ h$^{-1}$.

These and other embodiments are further illustrates by the following non-limiting examples.

General Methods

All reactions were conducted inside a dry nitrogen filled glove box or using standard Schlenk techniques unless otherwise noted. Solvents were purchased from Aldrich or Fisher and purified in a solvent purification system by percolation through neutral alumina under positive pressure of nitrogen. All chemical reagents were used as received from Aldrich, Combi-Blocks, and TCI unless otherwise noted. Tribasic potassium phosphate granular powder purchased from Fisher was nominally determined to be ca. $K_3PO_4 \cdot 5H_2O$ according to mass loss measurement after drying at 65° C. for 10 h in a vacuum oven, though this is likely an admixture of the known hydrates $K_3PO_4 \cdot 3H_2O$ and $K_3PO_4 \cdot 7H_2O$. Tribasic potassium phosphate monohydrate was purchased from Aldrich and ground with a mortar and pestle prior to use. Potassium hydroxide was purchased from EMD Millipore and ground with a mortar and pestle prior to use. Bis-{2-[(acetyl-κO)amino]phenyl-κC}bis[μ-(p-toluenesulfonate)]dipalladium was prepared according to literature procedure.

All products are purified with forced-flow chromatography on Teledyne IscoRediSep® prepacked silica gel columns. Infrared spectra (FT-IR) were obtained in dichloromethane solution on a Thermo Nicolet spectrometer for Rh(acac)(CO)(L) complexes. 1H, $^{13}$C{$^1$H}, $^{31}$P{$^1$H} nuclear magnetic resonance spectra (NMR) were obtained on a Bruker 300 MHz or 500 MHz spectrometer and values reported in ppm (δ) referenced against residual CHCl$_3$, CHDCl$_2$, etc. Spin-spin coupling constants are described as singlet (s), doublet (d), triplet (t), quartet (q), quintet (quint), broad (br) or multiplet (m), with coupling constants (J) in Hz. High resolution mass spectrometry (HR-MS) data were obtained using an Agilent 6210 High Resolution Electrospray TOF-MS.

EXAMPLE 1

Preparation of tri(1-adamantyl)phosphine

An oven-dried 100 ml round-bottomed flask equipped with a magnetic stir bar was charged with di-l-adamantylphosphine (2.35 g, 7.77 mmol, 1.0 equiv) and 1-adamantylacetate (1.66 g, 8.54 mmol, 1.1 equiv) in the glove box. dichloromethane (40 ml) was added to dissolve the entire solid. The flask was capped with a rubber septum, and taken out of the glove box. Me$_3$SiOTf (1.69 ml, 9.32 mmol, 1.2 equiv) was added by syringe and the reaction mixture was stirred at room temperature for 24 h. Triethylamine(5.4 ml, 39 mmol, 5.0 equiv)was then added and the reaction was stirred for an additional 0.5 h at room temperature. The neutralized PAd$_3$ subsequently precipitated from solution and was isolated by simple filtration on a disposable filter funnel followed by rinsing with ethanol (50 ml). After aspiration for 0.5 h, 2.2 g (63%) of 1 obtained as a pure white powder. Although a solution of PAd$_3$ is prone to oxidation under air, material in the solid state can be stored on the bench top for at least three months without substantial decomposition. Note that slow decompose in chlorinated solvent (dichloromethane, chloroform) was observed even under an inert atmosphere, but the compound appears stable in solutions of THF, benzene and toluene under N$_2$.

$^1$H NMR (501 MHz, CD$_2$Cl$_2$) δ 2.13 (br, 18H), 1.84 (br, 9H), 1.74-1.58 (m, 18H).

$^{13}$C NMR (126 MHz, CD$_2$Cl$_2$) δ 42.68 (br), 41.10 (d, J=34.3 Hz), 37.0 , 29.5 (d, J=7.2 Hz).

$^{31}$P NMR (121 MHz, C$_6$D$_6$) δ 59.35.

HRMS (ESI) m/z calculated for C$_{30}$H$_{46}$PO (M+17) 453.3286, found 453.3289.

EXAMPLE 2

Preparation of Rh(acac)(CO)(PAd$_3$)

PAd$_3$ (22 mg, 50 μmol, 1 equiv) and Rh(acac)(CO)$_2$ (12.9 mg, 50 μmol, 1 equiv) were dissolved in THF (2 mL) inside the glove box and stirred for 12 h. After evaporation of solvent and purification of the residue by flash chromatography (90% hexane, 10% ethyl acetate) and drying of the resulting solid under vaccum, 10.5 mg (32%) of the metal complex was obtained as yellow powder.

$^1$H NMR (300 MHz, CDCl$_3$) δ 5.52 (s, 1H), 2.62 (br, 18H), 2.08 (s, 3H), 2.08-1.98 (br, 9H), 1.94 (s, 3H), 1.90-1.62 (m, 18H).

$^{13}$C{$^1$H} NMR (126 MHz, CDCl$_3$) δ 192.9 (dd, J=76.8, 19.3 Hz), 188.1 , 184.0 , 100.9 (d, J=2.5 Hz), 48.2 (d, J=7.3 Hz), 42.3 (br) , 36.8 (br), 29.6 (d, J=7.6 Hz), 27.7 (d, J=4.6 Hz), 27.1.

$^{31}$P{$^1$H} NMR (121 MHz, CDCl$_3$) δ 90.6 (d, J=174.6 Hz).

EXAMPLE 3

Figure 13:
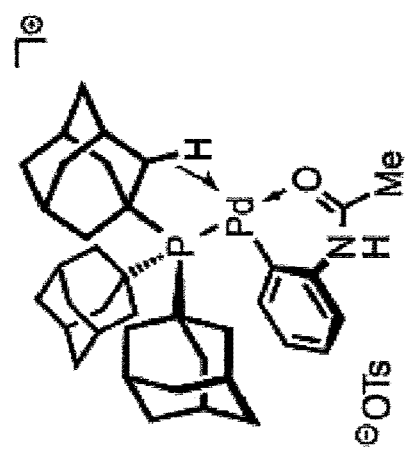
FIG. 13 illustrates one embodiment of a transition metal catalyst described herein.

Preparation of Catalyst {2-[(acetyl-κO)amino)phenyl-κC](tri-1-adamantylphosphine)palladium}$^+$(p-toluenesulfonate)$^-$ Tri(1-adamantyl)phosphine (44 mg, 0.1 mmol, 1 equiv) and bis-{2-[(acetyl-κO)amino]phenyl-κC}bis[μ-(4-methyl-benzenesulfonate)]dipalladium (41 mg, 0.05 mmol, 0.5 equiv) were weighed into a 20 ml scintillation vial with a magnetic stir bar and brought into glove box. THF (4 ml) was added to the solid. The reaction mixture was stirred at room temperature for 20 min, then concentrated to ca. 1 ml and diluted with diethyl ether (15 ml). The resulting solid that formed was isolated by filtration then dried under vacuum to afford 75 mg (88%) of catalyst as a yellow powder. Catalyst structure is illustrated in FIG. 13. Crystals suitable for single crystal X-ray diffraction were grown from a THF solution at room temperature.

$^1$H NMR (501 MHz, CD$_2$Cl$_2$) δ 12.32 (s, 1H), 7.80 (d, J=7.8 Hz, 2H), 7.52-7.41 (m, 2H), 2.35-2.31 (m, 1H), 7.18 (m, 3H), 6.89-6.82 (m, 1H), 2.49 (s, 3H), 2.45 (br, 18H), 2.40 (s, 3H), 2.11 (br, 9H), 1.84 (br, 18H).

$^{31}$P NMR (203 MHz, CD$_2$Cl$_2$) δ 47.24.

$^{13}$C NMR (126 MHz, CD$_2$Cl$_2$) δ 169.73 (d, J=2.3 Hz), 144.09 , 142.19 (d, J=10.0 Hz), 139.32, 132.65 (d, J=1.6 Hz), 128.53 , 127.43 , 125.84 , 123.40 (d, J=5.6 Hz), 120.77, 117.77 (d, J=6.6 Hz), 48.36 (d, J=6.2 Hz), 41.56, 36.08, 29.04 (d, J=7.7 Hz), 21.04 (d, J=3.5 Hz), 20.99.

EXAMPLE 4

Preparation of Pd(PAd$_3$)(Ph)(κ$^2$-OAc)

Pd(py)$_2$(Ph)(I) (28 mg, 0.060 mmol, 1 equiv), prepared according to Grushin's protocol,[6] and silver acetate (10 mg, 0.060 mmol, 1 equiv) were stirred in toluene (0.5 mL). After 1.5 h the mixture was filtered through a Celite plug and concentrated to 1 mL. PAd$_3$ (20 mg, 0.046 mmol, 1 equiv) was then added to the solution and stirred for 10 min. The resulting mixture was evaporated, redissolved in toluene (0.5 mL), and diluted with ether (10 mL). After sonication, the resulting solid was collected by filtration and aspirated for 0.5 h, yielding 23 mg (57%) of the metal complex as a yellow powder.

$^1$H NMR (501 MHz, CD$_2$Cl$_2$) δ 7.30 (d, J=7.9 Hz, 2H), 6.82 (t, J=7.3 Hz, 2H), 6.77 (t, J=7.1 Hz, 1H), 2.42 (br, 18H), 1.86 (br, 9H), 1.79 (s, 3H), 1.72-1.52 (m, 18H).

$^{13}$C{$^1$H} NMR (126 MHz, CD$_2$Cl$_2$) δ 186.9, 141.0, 135.8 (d, J=3.0 Hz), 126.9, 123.5, 49.1 (d, J=6.8 Hz), 42.3, 36.4, 29.4 (d, J=7.9 Hz), 23.6.

$^{31}$P{$^1$H} NMR (203 MHz, CD$_2$Cl$_2$) δ 68.2.

HRMS (ESI) m/z calculated for Pd(PAd$_3$)(Ph)(MeCN) cation C$_{38}$H$_{53}$NPPd 660.2950, found 660.2944.

EXAMPLE 5

Preparation of SePAd$_3$

PAd$_3$ (11 mg, 25 μmol, 1 equiv) and selenium (9 mg, 95 μmol, 3.8 equiv) were dissolved in THF (2 mL) inside the glove box and stirred for 1 h. After removal of excess selenium by decantation, the mother liquor was evaporated under vacuum to yield 13 mg (99%) of SePAd$_3$ as a white powder.

$^1$H NMR (501 MHz, CDCl$_3$) δ 2.41 (br, 18H), 1.97 (br, 9H), 1.79-1.33 (m, 18H).

$^{13}$C{$^1$H} NMR (126 MHz, CDCl$_3$) δ 48.15 (d, J=19.6 Hz), 40.14 (br), 36.53 (br), 29.17 (d, J=8.5 Hz).

$^{31}$P{$^1$H} NMR (203 MHz, CDCl$_3$) δ 79.69 (s, $^1J_{P-Se}$= 669.9 Hz).

EXAMPLES 6-44

Suzuki-Miyaura Coupling and Characterization of Products

The following products were prepared via Suzuki-Miyaura with PAd$_3$ metal catalyst. As described in the procedures below, the PAd$_3$ metal catalyst was generated in situ by addition of a THF stock solution of bis-{2-[(acetyl-κO)amino]phenyl-κC}bis[μ(p-toluenesulfonate)]dipalladium (3) and PAd$_3$ ligand. The catalyst formed in situ is described and characterized in Example 3 and illustrated in FIG. 13.

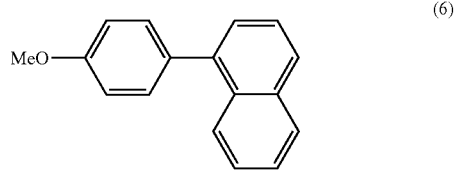 [SMILES: COc1ccc(-c2cccc3ccccc23)cc1]

(6)

To a mixture of 4-chloroanisole (62 μL, 0.50 mmol, 1 equiv), 1-napthylboronic acid (94 mg, 0.55 mmol, 1.1 equiv), and K$_3$PO$_4$.H$_2$O (0.35 g, 1.5 mmol, 3 equiv) was added toluene (800 μL), a THF stock solution of 3 and PAd$_3$ (100 μL, 0.25 μmol Pd/PAd$_3$) and the mixture was stirred at room temperature for 5 h. The reaction mixture was diluted with ethyl acetate then extracted with water. The combined organic layers were evaporated and the crude product was purified by flash chromatography. After drying, 104 mg of 6 (89%) was obtained as a white solid. NMR spectroscopic data agreed with literature values.

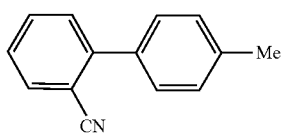

(7)

A mixture of 2-chlorobenzonitrile (69 mg, 0.50 mmol, 1 equiv), 4-tolylboronic acid (75 mg, 0.55 mmol, 1.1 equiv), THF (100 μL) were stirred into slurry, added K$_3$PO$_4$.5H$_2$O (0.33 g, 1.1 mmol, 2.2 equiv) then a THF stock solution of 3 and PAd$_3$ (10 μL, 0.025 μmol Pd/PAd$_3$). The reaction vial was capped then taken outside the glove box to an oil bath preset at 100° C. for 10 min. The reaction mixture was diluted with ethyl acetate then extracted with water. The combine organic layers were evaporated and the crude product was purified by flash chromatography. After drying, 92 mg (95%) of 7 was obtained as a colorless crystalline solid. NMR spectroscopic data agreed with literature values.

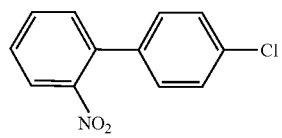

(8)

A mixture of 1-chloro-2-nitrobenzene (79 mg, 0.50 mmol, 1 equiv), 4-chlorophenylboronic acid (80 mg, 0.51 mmol, 1.02 equiv), and THF (100 μL) were stirred into slurry. Then K$_3$PO$_4$.5H$_2$O (0.33 g, 1.1 mmol, 2.2 equiv) was added followed by a THF stock solution of 3 and PAd$_3$ (10 μL in THF, 0.025 μmol of Pd/PAd$_3$). The reaction vial was capped then taken outside the glove box to an oil bath preset at 100° C. for 10 min. The reaction mixture was diluted with ethyl acetate then extracted with water. The combined organic layers were evaporated and the crude product was purified by flash chromatography. After drying, 114 mg (97%) of 8 was obtained as a light yellow oil. NMR spectroscopic data agreed with literature values.

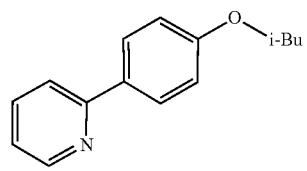

(9)

A mixture of 2-chloropyridine (47 μL, 0.50 mmol, 1 equiv), (4-isobutoxyphenyl)boronic acid (107 mg, 0.55 mmol, 1.1 equiv), and n-butanol (200 μL) were stirred into slurry. Then K$_3$PO$_4$.5H$_2$O (0.33 g, 1.1 mmol, 2.2 equiv) was added followed by a THF stock solution of 3 and PAd$_3$ (10 μL, 0.025 μmol of Pd/PAd$_3$). The reaction vial was capped then taken outside the glove box to an oil bath preset at 100° C. for 1 h. The reaction mixture was diluted with ethyl acetate then extracted with water. The combined organic layers were evaporated and the crude product was purified by flash chromatography. After drying, 84 mg (74%) of 9 was obtained as a white solid.

$^1$H NMR (501 MHz, CDCl$_3$) δ 8.67 (ddd, J=4.9, 1.8, 1.0 Hz, 1H), 8.00-7.92 (m, 2H), 7.77-7.66 (m, 2H), 7.19 (ddd, J=7.2, 4.9, 1.4 Hz, 1H), 7.05-6.98 (m, 2H), 3.80 (d, J=6.5 Hz, 2H), 2.14 (dp, J=13.3, 6.7 Hz, 1H), 1.07 (d, J=6.7 Hz, 6H).

$^{13}$C{$^1$H} NMR (126 MHz, CDCl$_3$) δ 160.2, 157.2, 149.5, 136.6, 131.8, 128.1, 121.3, 119.8, 114.7, 74.5, 28.3, 19.3.

HRMS (ESI) m/z calculated for C$_{15}$H$_{17}$NO (M+1) 228.1383, found 228.1392.

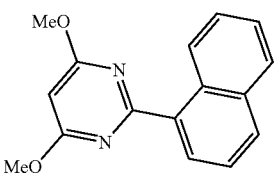

(10)

A mixture of 2-chloro-4,6-dimethoxypyrimidine (87 mg, 0.50 mmol, 1 equiv), 2-napthylboronic acid (95 mg, 0.55 mmol, 1.1 equiv), THF (150 μL) were stirred into slurry. Then K$_3$PO$_4$.5H$_2$O (0.33 g, 1.1 mmol, 2.2 equiv) was added followed by a THF stock solution of 3 and PAd$_3$ (10 μL, 0.025 μmol of Pd/PAd$_3$). The reaction vial was capped then taken outside the glove box to an oil bath preset at 100° C. for 5 h. The reaction mixture was diluted with ethyl acetate then extracted with water. The combine organic layers were evaporated and the crude product was purified by flash chromatography. After drying, 106 mg (80%) of 10 was obtained as a white solid.

$^1$H NMR (501 MHz, CDCl$_3$) δ 8.99-8.92 (m, 1H), 8.22 (ddt, J=7.0, 2.7, 1.4 Hz, 1H), 7.97 (ddt, J=23.5, 8.1, 1.4 Hz, 2H), 7.64-7.51 (m, 3H), 6.14-6.09 (m, 1H), 4.11-4.06 (m, 6H).

$^{13}$C{$^1$H} {$^1$H} NMR (126 MHz, CDCl$_3$) δ 171.3, 165.7, 135.5, 134.2, 131.1, 130.6, 129.4, 128.5, 126.5, 126.3, 125.7, 125.1, 88.0, 54.2.

HRMS (ESI) m/z calculated for C$_{16}$K$_4$N$_2$O$_2$ (M+1) 267.1128, found 267.1123.

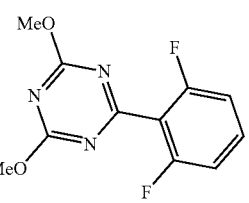

(11)

To a mixture of 2-chloro-4,6-dimethoxy-1,3,5-triazine (88 mg, 0.50 mmol, 1 equiv), 2,6-difluorophenylboronic acid (118 mg, 0.75 mmol, 1.5 equiv), and K$_2$CO$_3$.1.5H$_2$O (0.25 g, 1.5 mmol, 3 equiv) was added THF (300 μL) then a THF stock solution of 3 and PAd$_3$ (200 μL in THF, 0.5 μmol) and the mixture was stirred at room teperature for 5 h. The reaction mixture was diluted with ethyl acetate then extracted with water. The combine organic layers were evaporated and the crude product was purified by flash chromatography. After drying, 118 mg (93%) of 11 was obtained as a white solid.

$^1$H NMR (501 MHz, CDCl$_3$) δ 7.39 (tt, J=8.4, 6.2 Hz, 1H), 7.02-6.93 (m, 2H), 4.07 (s, 6H).

$^{13}$C{$^1$H} NMR (126 MHz, CDCl$_3$) δ 172.5, 170.6 (t, J=1.6 Hz), 160.6 (dd, J=255.1, 6.0 Hz), 131.9 (t, J=11.3 Hz), 115.4 (t, J=16.4 Hz), 111.9 (dd, J=20.2, 5.0 Hz), 55.5.

HRMS (ESI) m/z calculated for C$_{11}$H$_9$F$_2$N$_3$O$_2$ (M+1) 254.0736, found 254.0722.

(12)

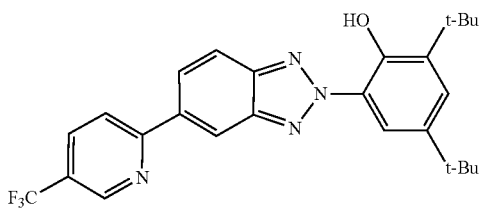

To a mixture of 2,4-di-tert-butyl-6-(5-chloro-2H-benzotriazol-2-yl)phenol (179 mg, 0.50 mmol, 1 equiv), 4-trifluoromethylphenylboronic acid (114 mg, 0.60 mmol, 1.2 equiv), K$_3$PO$_4$.5H$_2$O (0.36 g, 1.2 mmol, 2.4 equiv), and KO$^t$Bu (56 mg, 0.50 mmol, 1 equiv) was added a THF stock solution of 3 and PAd$_3$ (2 mL in THF, 5 μmol of Pd/PAd$_3$). The mixture was stirred at 70° C. for 5 h. The reaction mixture was diluted with ethyl acetate then extracted with water. The combine organic layers were evaporated and the crude product was purified by flash chromatography. After drying, 224 mg (96%) of 12 was obtained as a white solid.

$^1$H NMR (500 MHz, CDCl$_3$) δ 11.63 (s, 1H), 8.22 (d, J=2.4 Hz, 1H), 8.01 (t, J=1.2 Hz, 1H), 7.91 (dd, J=8.9, 0.9 Hz, 1H), 7.71-7.58 (m, 5H), 7.37 (d, J=2.4 Hz, 1H), 1.44 (s, 9H), 1.32 (s, 9H).

$^{13}$C{$^1$H}{$^1$H} NMR (126 MHz, CDCl$_3$) δ 145.7, 143.0, 142.0, 141.3, 140.7, 138.1, 137.6, 128.8 (q, J=32.6 Hz), 126.7, 126.7, 125.0 (q, J=3.7 Hz), 124.4, 124.1, 123.1 (q, J=272.2 Hz), 117.1, 115.1, 114.6, 34.7, 33.6, 30.5, 28.5.

HRMS (ESI) m/z calculated for C$_{27}$H$_{28}$F$_3$N$_3$O (M+1) 468.2257, found 468.2257.

(13)

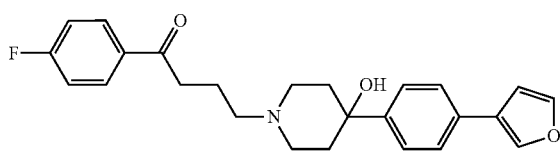

To a mixture of haloperidol (94 mg, 0.25 mmol, 1 equiv), furan-3-ylboronic acid (42 mg, 0.38 mmol, 1.5 equiv), 1,3,5-trimethyoxybenzene (42 mg, 0.25 mmol, 1 equiv) as internal standard, and K$_3$PO$_4$.H$_2$O (0.17 g, 0.75 mmol, 3 equiv) was added THF (400 μL) and a THF stock solution of 3 and PAd$_3$ (100 μL, 0.25 μmol of Pd/PAd$_3$) and the mixture was stirred at 100° C. for 12 h. The NMR yield of 13 was 80% determined against the internal standard. The reaction mixture was diluted with ethyl acetate then extracted with water. The combine organic layers were evaporated and the crude product was purified by flash chromatography and preparative HPLC. After drying, 56 mg (55%) of 13 was obtained as a white solid.

$^1$H NMR (501 MHz, CDCl$_3$) δ 8.09-8.01 (m, 2H), 7.75 (t, J=1.2 Hz, 1H), 7.49 (d, J=3.5 Hz, 5H), 7.21-7.12 (m, 2H), 6.72 (dd, J=1.8, 0.9 Hz, 1H), 3.02 (t, J=7.1 Hz, 2H), 2.83 (d, J=11.2 Hz, 2H), 2.56-2.44 (m, 4H), 2.04 (td, J=16.6, 14.3, 9.7 Hz, 4H), 1.79-1.72 (m, 2H).

$^{13}$C{$^1$H} NMR (126 MHz, CDCl$_3$) δ 198.4, 165.6 (d, J=254.3 Hz), 143.7, 138.5, 131.2, 130.7, 130.7, 126.0, 125.8, 125.0, 115.7, 115.5, 108.8, 71.3, 57.9, 49.4, 38.4, 36.3, 22.0.

HRMS (ESI) m/z calculated for C$_{25}$H$_{27}$FNO$_3$ (M+1) 408.1969, found 408.1960.

(14)

To a mixture of montelukast sodium salt (152 mg, 0.25 mmol, 1 equiv), 3,4,5-trifluorophenyl boronic acid (53 mg, 0.30 mmol, 1.2 equiv), and K$_3$PO$_4$.5 H$_2$O (0.18 g, 0.60 mmol, 2.4 equiv) was added THF (2 mL) then a THF stock solution of 3 and PAd$_3$ (1 mL, 2.5 μmol of Pd/PAd$_3$). The mixture was stirred at 100° C. for 5 h. The reaction mixture was diluted with ethyl acetate then extracted with saturated ammonium chloride then water. The combine organic layers were evaporated and the crude product was purified by flash chromatography. After drying, 152 mg (89%) of 14 was obtained as yellow solid.

$^1$H NMR (500 MHz, CDCl$_3$) δ 8.18 (d, J=1.8 Hz, 1H), 8.10 (d, J=8.5 Hz, 1H), 7.82 (d, J=8.4 Hz, 1H), 7.74 (d, J=1.9 Hz, 1H), 7.67 (d, J=8.6 Hz, 1H), 7.62 (dd, J=5.0, 1.8 Hz, 1H), 7.59 (d, J=17.1 Hz, 1H), 7.48 (d, J=17.1 Hz, 1H), 7.40 (m, 1H), 7.37-7.28 (m, 5H), 7.18-7.13 (m, 2H), 7.10 (ddd, J=7.6, 5.8, 3.0 Hz, 1H),5.29 (s, 1H),4.01 (t, J=7.2 Hz, 1H), 3.17 (ddd, J=13.5, 11.2, 5.1 Hz, 1H), 2.90 (ddd, J=13.5, 11.2, 5.4 Hz, 1H), 2.65 (d, J=13.1 Hz, 1H), 2.57 (d, J=16.2 Hz, 1H), 2.45 (d, J=13.1 Hz, 1H), 2.38 (d, J=16.1 Hz, 1H), 2.28-2.09 (m, 2H), 1.60 (d, J=4.9 Hz, 6H), 0.71-0.24 (m, 4H).

$^{13}$C{$^1$H} NMR (126 MHz, CDCl$_3$) δ 176.3, 156.9, 151.5 (ddd, J=249.9, 10.0, 4.2 Hz), 147.7, 145.2, 143.6, 140.2, 139.7 (dt, J=253.3, 15.4 Hz),139.4, 136.5, 136.4, 136.3 (m), 135.4, 131.5, 129.0, 128.6, 128.5, 128.4, 127.1, 126.9, 126.5, 126.5, 126.4, 125.6, 125.4, 125.0, 119.4, 111.4 (dd, J=12.6, 5.0 Hz), 73.8, 50.3, 40.3, 40.0, 38.9, 32.3, 31.8, 16.8, 12.7, 12.4.

HRMS (ESI) m/z calculated for C$_{41}$H$_{38}$F$_3$NO$_3$S (M+1) 682.2597, found 682.2598.

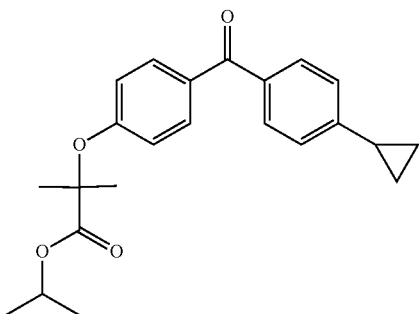

(15)

To a mixture of fenofibrate (90 mg, 0.25 mmol, 1 equiv), cyclopropylboronic acid (32 mg, 0.38 mmol, 1.5 equiv), and K$_3$PO$_4$.H$_2$O (0.18 g, 0.75 mmol, 3 equiv) was added toluene (400 µL) then a THF stock solution of 3 and PAd$_3$ (50 µL, 0.125 µmol of Pd/PAd$_3$). The mixture was stirred at 100° C. for 5 h. The reaction mixture was diluted with ethyl acetate then extracted with water. The combine organic layers were evaporated and the crude product was purified by flash chromatography. After drying, 84 mg (92%) of 15 was obtained as a white solid.

$^1$H NMR (501 MHz, CDCl$_3$) δ 7.80-7.72 (m, 2H), 7.72-7.66 (m, 2H), 7.19-7.12 (m, 2H), 6.91-6.84 (m, 2H), 5.11 (hept, J=6.3 Hz, 1H), 1.99 (tt, J=8.4, 5.0 Hz, 1H), 1.68 (s, 6H), 1.23 (d, J=6.3 Hz, 6H), 1.13-1.05 (m, 2H), 0.85-0.78 (m, 2H).

$^{13}$C{$^1$H} NMR (126 MHz, CDCl$_3$) δ 195.2, 173.2, 159.3, 149.2, 135.2, 131.9, 131.0, 130.1, 125.2, 117.1, 79.3, 69.3, 25.4, 21.5, 15.7, 10.3.

HRMS (ESI) m/z calculated for C$_{23}$H$_{26}$O$_4$ (M+1) 367.1904, found 367.1888.

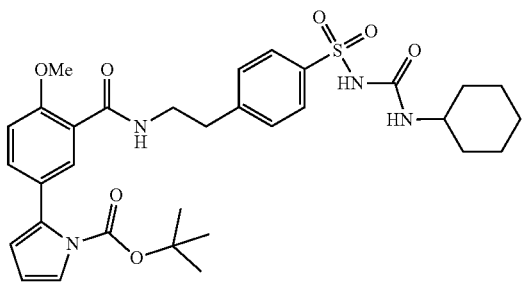

(16)

To a mixture of glibenclamide (247 mg, 0.50 mmol, 1 equiv), N-Boc-pyrroleboronic acid (127 mg, 0.60 mmol, 1.2 equiv), 1,3,5-trimethyoxybenzene (84 mg, 0.50 mmol, 1 equiv) as internal standard, and K$_3$PO$_4$.5H$_2$O (0.36 g, 1.2 mmol, 2.4 equiv) was added a THF stock solution of 3 and PAd$_3$ (2 mL in THF, 5 µmol of Pd/PAd$_3$). The mixture was stirred at 100° C. for 5 h. The crude NMR yield was 65% versus the internal standard. The reaction mixture was diluted with ethyl acetate then extracted with water. The combine organic layers were evaporated and the crude product was purified by flash chromatography and preparative HPLC. After drying, 116 mg (37%) of 16 was obtained as a white solid.

$^1$H NMR (501 MHz, CDCl$_3$) δ 8.13 (d, J=2.4 Hz, 1H), 7.83 (t, J=5.8 Hz, 1H), 7.78 (d, J=8.3 Hz, 2H), 7.43-7.31 (m, 3H), 7.26 (dd, J=3.3, 1.8 Hz, 1H), 6.86 (d, J=8.5 Hz, 1H), 6.37 (d, J=7.9 Hz, 1H), 6.14 (t, J=3.3 Hz, 1H), 6.11 (dd, J=3.3, 1.8 Hz, 1H), 3.75 (s, 3H), 3.69 (q, J=6.6 Hz, 2H), 3.56-3.47 (m, 1H), 2.96 (t, J=6.9 Hz, 2H), 1.80-1.72 (m, 2H), 1.64-1.46 (m, 4H), 1.34 (s, 9H), 1.30-1.03 (m, 4H).

$^{13}$C{$^1$H} NMR (126 MHz, CDCl$_3$) δ 165.2, 156.6, 150.1, 149.2, 146.3, 137.7, 133.8, 133.6, 133.0, 129.9, 127.7, 127.2, 122.6, 120.3, 114.7, 110.6, 110.6, 83.7, 56.0, 49.2, 40.5, 35.7, 33.0, 27.8, 25.4, 24.6.

HRMS (ESI) m/z calculated for C$_{32}$H$_{40}$N$_4$O$_7$S (M+1) 625.2691, found 625.2700.

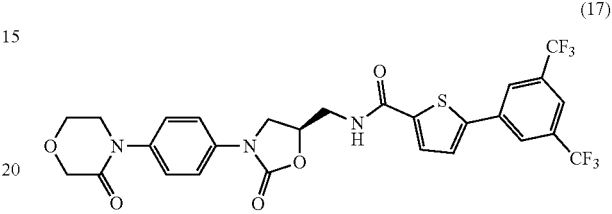

(17)

To a mixture of 5-R-rivaroxaban (55 mg, 0.13 mmol, 1 equiv), 3,5-bis(trifluoromethyl) phenylboronic acid (35 mg, 0.14 mmol, 1.1 equiv), 1,3,5-trimethyoxybenzene (21 mg, 0.13 mmol, 1 equiv) as internal standard, and K$_3$PO$_4$.5H$_2$O (82 mg, 0.28 mmol, 2.2 equiv) was added a THF stock solution of 3 and PAd$_3$ (2.5 mL, 6.25 µmol of Pd/PAd$_3$). The mixture was stirred at 100° C. for 5 h. The crude NMR yield was 83% versus the internal standard. The reaction mixture was diluted with ethyl acetate then extracted with water. The combine organic layers were evaporated and the crude product was purified by flash chromatography and preparative HPLC. After drying, 43 mg (56%) of 17 was obtained as a white solid.

$^1$H NMR (501 MHz, CDCl$_3$) δ 7.94 (s, 2H), 7.76 (s, 1H), 7.55-7.45 (m, 3H), 7.33 (d, J=3.9 Hz, 1H), 7.30-7.23 (m, 2H), 6.90 (s, 1H), 4.82 (dd, J=6.0, 3.0 Hz, 1H), 4.26 (s, 2H), 4.04 (t, J=8.9 Hz, 1H), 3.99-3.93 (m, 2H), 3.88-3.77 (m, 2H), 3.76-3.63 (m, 3H).

$^{13}$C{$^1$H} NMR (126 MHz, CDCl$_3$) δ 166.9, 162.1, 154.4, 145.6, 139.0, 137.4, 136.6, 135.5, 132.3 (q, J=34.0 Hz), 127.6 (q, J=476.3 Hz), 126.3, 126.0, 124.1, 121.9, 119.2, 71.9, 68.6, 64.1, 49.7, 47.7, 42.4.

HRMS (ESI) m/z calculated for C$_{27}$H$_{21}$F$_6$N$_3$O$_5$S (M+1) 614.1179, found 614.1196.

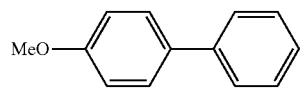

(18)

To a mixture of 4-chloroanisole (62 µL, 0.50 mmol, 1 equiv), phenylboronic acid (67 mg, 0.55 mmol, 1.1 equiv), and K$_3$PO$_4$.H$_2$O (0.35 g, 1.5 mmol, 3 equiv) was added toluene (800 µL) then a THF stock solution of 3 and PAd$_3$ (100 µL, 0.25 µmol of Pd/PAd$_3$). The mixture was stirred at room temperature for 5 h. The reaction mixture was diluted with ethyl acetate then extracted with water. The combine organic layers were evaporated and the crude product was purified by flash chromatography. After drying, 75 mg (81%) of 18 was obtained as a white solid. NMR spectroscopic data agreed with literature values.

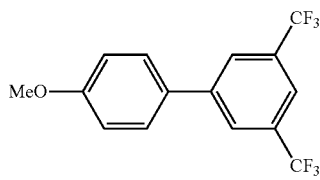

(19)

To a mixture of 4-chloroanisole (62 μL, 0.50 mmol, 1 equiv), 3,5-bis(trifluoromethyl) phenylboronic acid (142 mg, 0.55 mmol, 1.1 equiv), and $K_3PO_4 \cdot 5H_2O$ (0.33 g, 1.1 mmol, 2.2 equiv) was added THF (400 μL) then a THF stock solution of 3 and $PAd_3$ (100 μL, 0.25 μmol of $Pd/PAd_3$). The mixture was stirred at room temperature for 5 h. The reaction mixture was diluted with ethyl acetate then extracted with water. The combine organic layers were evaporated and the crude product was purified by flash chromatography. After drying, 146 mg (91%) of 19 was obtained as a colorless oil. NMR spectroscopic data agreed with literature values.

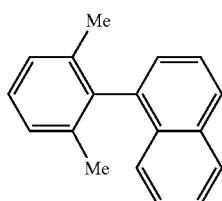

(20)

To a mixture of 2-chloro-1,3-dimethylbenzene (66 μL, 0.50 mmol, 1 equiv), 1-napthylboronic acid (129 mg, 0.75 mmol, 1.5 equiv), and $K_3PO_4 \cdot 5H_2O$ (0.45 g, 1.5 mmol, 3 equiv) was added THF (400 μL) then a THF stock solution of 3 and $PAd_3$ (100 μL, 0.25 μmol of $Pd/PAd_3$). The mixture was stirred at 100° C. for 5 h. The reaction mixture was diluted with ethyl acetate then extracted with water. The combine organic layers were evaporated and the crude product was purified by flash chromatography. After drying, 93 mg (80%) of 20 was obtained as a white solid. NMR spectroscopic data agreed with literature values.

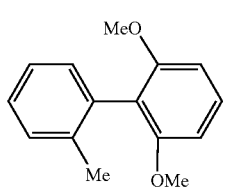

(21)

To a mixture of 2-chlorotoluene (59 μL, 0.50 mmol, 1 equiv), 2,6-dimethoxyphenylboronic acid (136 mg, 0.75 mmol, 1.5 equiv), and $K_3PO_4 \cdot H_2O$ (0.35 g, 1.5 mmol, 3 equiv) was added toluene (400 μL) then a catalyst stock solution of 3 and $PAd_3$ (100 μL, 0.25 μmol of $Pd/PAd_3$). The mixture was stirred at 50° C. for 5 h. The reaction mixture was diluted with ethyl acetate then extracted with water. The combine organic layers were evaporated and the crude product was purified by flash chromatography. After drying, 79 mg (70%) of 21 was obtained as a white solid. NMR spectroscopic data agreed with literature values.

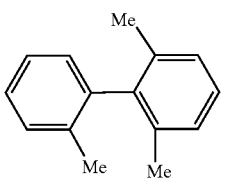

(22)

To a mixture of 2-chlorotoluene (59 μL, 0.50 mmol, 1 equiv), 2,6-dimethylphenylboronic acid (112 mg, 0.75 mmol, 1.5 equiv), and $K_3PO_4 \cdot 5H_2O$ (0.45 g, 1.5 mmol, 3 equiv) was added THF (400 μL) then a THF stock solution of 3 and $PAd_3$ (100 μL, 0.25 μmol of $Pd/PAd_3$). The mixture was stirred at 100° C. for 9 h. The reaction mixture was diluted with ethyl acetate then extracted with water. The combine organic layers were evaporated and the crude product was purified by flash chromatography. After drying, 69 mg (70%) of 22 was obtained as a colorless oil. NMR spectroscopic data agreed with literature values.

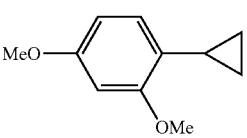

(23)

To a mixture of 1-bromo-2,4-dimethoxybenzene (72 μL, 0.50 mmol, 1 equiv), cyclopropylboronic acid (64 mg, 0.75 mmol, 1.5 equiv), and $K_3PO_4 \cdot H_2O$ (0.35 mg, 1.5 mmol, 3 equiv) was added toluene (400 μL) then a THF stock solution of 3 and $PAd_3$ (100 μL, 0.25 μmol of $Pd/PAd_3$) and the mixture was stirred at 100° C. for 5 h. The reaction mixture was diluted with ethyl acetate then extracted with water. The combine organic layers were evaporated and the crude product was purified by flash chromatography. After drying, 80 mg (90%) of 23 was obtained as a colorless oil. NMR spectroscopic data agreed with literature values.

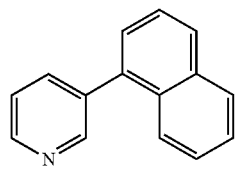

(24)

To a mixture of 3-chloropyridine (48 μL, 0.50 mmol, 1 equiv), 1-napthylboronic acid (95 mg, 0.55 mmol, 1.1 equiv), and $K_3PO_4 \cdot H_2O$ (0.35 g, 1.5 mmol, 3 equiv) was added toluene (400 μL) then a THF stock solution of 3 and $PAd_3$ (100 μL, 0.25 μmol). The mixture was stirred at 90° C. for 5 h. The reaction mixture was diluted with ethyl acetate then extracted with water. The combine organic layers were evaporated and the crude product was purified by flash chromatography. After drying, 70 mg (68%) of 24 was obtained as a white solid. NMR spectroscopic data agreed with literature values.

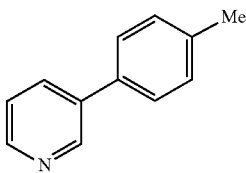

(25)

To a mixture of 3-chloropyridine (48 μL, 0.50 mmol, 1 equiv), 4-tolylboronic acid (75 mg, 0.55 mmol, 1.1 equiv), and K₃PO₄.H₂O (0.35 g, 1.5 mmol, 3 equiv) was added toluene (400 μL) then a THF stock solution of 3 and PAd₃ (100 μL, 0.25 μmol of Pd/PAd₃). The mixture was stirred at 90° C. for 5 h. The reaction mixture was diluted with ethyl acetate then extracted with water. The combine organic layers were evaporated and the crude product was purified by flash chromatography. After drying, 53 mg (63%) of 25 was obtained as a white solid. NMR spectroscopic data agreed with literature values.

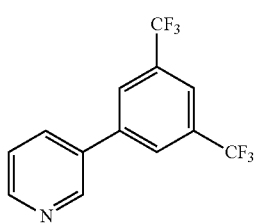

(26)

To a mixture of 3-chloropyridine (48 μL, 0.50 mmol, 1 equiv), 3,5-bis(trifluoromethyl) phenylboronic acid (142 mg, 0.55 mmol, 1.1 equiv), and K₃PO₄.H₂O (0.35 mg, 1.5 mmol, 3 equiv) was added toluene (400 μL) then a THF stock solution of 3 and PAd₃ (100 μL, 0.25 μmol of Pd/PAd₃). The mixture was stirred at 90° C. for 5 h. The reaction mixture was diluted with ethyl acetate then extracted with water. The combine organic layers were evaporated and the crude product was purified by flash chromatography. After drying, 143 mg (98%) of 26 was obtained as a white solid. NMR spectroscopic data agreed with literature values.

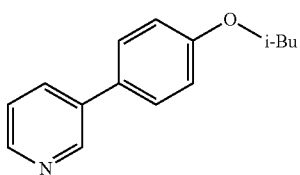

(27)

To a mixture of 3-chloropyridine (48 μL, 0.50 mmol, 1 equiv), (4-isobutoxyphenyl)boronic acid (107 mg, 0.55 mmol, 1.1 equiv), and K₃PO₄.5H₂O (0.33 g, 1.1 mmol, 2.2 equiv) was added THF (400 μL) then a THF stock solution of 3 and PAd₃ (100 μL, 0.25 μmol of Pd/PAd₃). The mixture was stirred at 100° C. for 12 h. The reaction mixture was diluted with ethyl acetate then extracted with water. The combine organic layers were evaporated and the crude product was purified by flash chromatography. After drying, 96 mg (84%) of 27 was obtained as a colorless oil. ¹H NMR (501 MHz, CDCl₃) δ 8.85-8.80 (m, 1H), 8.57-8.51 (m, 1H), 7.80 (dt, J=8.2, 1.9 Hz, 1H), 7.53-7.46 (m, 2H), 7.31 (dd, J=7.9, 5 Hz, 1H), 7.04-6.97 (m, 2H), 3.76 (d, J=6.6 Hz, 2H), 2.11 (dq, J=13.3, 6.7 Hz, 1H), 1.05 (d, J=6.9 Hz, 6H).

¹³C{¹H} NMR (126 MHz, CDCl₃) δ 159.5, 148.0, 147.8, 136.3, 133.8, 129.9, 128.1, 123.5, 115.1, 74.5, 28.3, 19.3.

HRMS (ESI) m/z calculated for C₁₅H₁₇NO (M+1) 228.1383, found 228.1377.

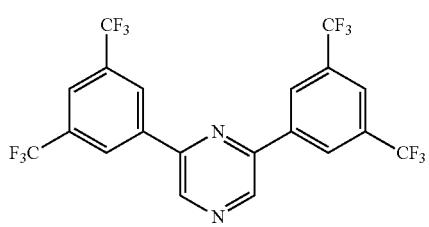

(28)

To a mixture of 2,6-dichloropyrazine (37 mg, 0.25 mmol, 1 equiv), 3,5-bis(trifluoromethyl)phenylboronic acid (142 mg, 0.55 mmol, 2.2 equiv), and K₃PO₄.5H₂O (0.33 g, 1.1 mmol, 4.4 equiv) was added THF (400 μL) then a THF stock solution of 3 and PAd₃ (100 μL, 0.25 μmol of Pd/PAd₃). The mixture was stirred at 70° C. for 5 h. The reaction mixture was diluted with ethyl acetate then extracted with water. The combine organic layers were evaporated and the crude product was purified by flash chromatography. After drying, 110 mg (87%) of 28 was obtained as a white solid.

¹H NMR (501 MHz, CDCl₃) δ 9.20 (s, 2H), 8.62-8.58 (m, 4H), 8.07 (s, 2H).

¹³C{¹H} NMR (126 MHz, CDCl₃) δ 149.2, 141.5, 137.9, 132.8 (q, J=33.7 Hz), 127.1, 123.9, 123.1 (q, J=273.4 Hz).

HRMS (ESI) m/z calculated for C₂₀H₈F₁₂N₂ (M+1) 505.0569, found 505.0563.

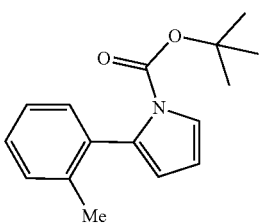

(29)

To a mixture of 2-chlorotoluene (59 μL, 0.50 mmol, 1 equiv), N-Boc-2-pyrroleboronic acid (158 mg, 0.75 mmol, 1.5 equiv), and K₃PO₄.5H₂O (0.45 g, 1.5 mmol, 3 equiv) was added THF (400 μL) then a THF stock solution of 3 and PAd₃ (100 μL, 0.25 μmol of Pd/PAd₃). The mixture was stirred at room temperature for 5 h. The reaction mixture was diluted with ethyl acetate then extracted with water. The combine organic layers were evaporated and the crude product was purified by flash chromatography. After drying, 124 mg (96%) of 29 was obtained as a colorless oil. NMR spectroscopic data agreed with literature values.

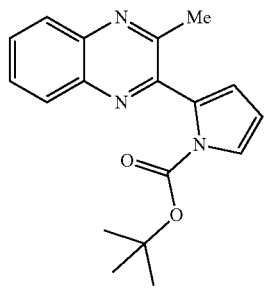
(30)

To a mixture of 2-chloro-3-methylquinoxaline (89 mg, 0.50 mmol, 1 equiv), N-Boc-2-pyrroleboronic acid (158 mg, 0.75 mmol, 1.5 equiv), and K$_3$PO$_4$.5H$_2$O (0.45 g, 1.5 mmol, 3 equiv) was added THF (400 μL) then a THF stock solution of 3 and PAd$_3$ (100 μL, 0.25 μmol of Pd/PAd$_3$). The mixture was stirred at 70° C. for 5 h. The reaction mixture was diluted with ethyl acetate then extracted with water. The combine organic layers were evaporated and the crude product was purified by flash chromatography. After drying, 148 mg (96%) of 30 was obtained as a white solid.

$^1$H NMR (501 MHz, CDCl$_3$) δ 8.09-7.98 (m, 2H), 7.74-7.63 (m, 2H), 7.43 (dd, J=3.4, 1.7 Hz, 1H), 6.44 (dd, J=3.3, 1.7 Hz, 1H), 6.33 (t, J=3.4 Hz, 1H), 2.56 (s, 3H), 1.17 (s, 9H).

$^{13}$C{$^1$H} NMR (126 MHz, CDCl$_3$) δ 154.5, 149.6, 148.6, 141.2, 140.3, 130.7, 129.8, 129.1, 129.0, 128.3, 122.5, 115.6, 111.4, 84.2, 27.4, 23.0.

HRMS (ESI) m/z calculated for C$_{18}$H$_{19}$N$_3$O$_2$ (M+1) 310.1550, found 310.1552.

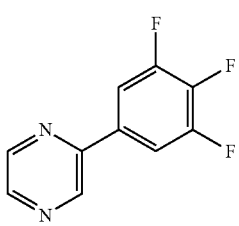
(31)

To a mixture of 2-chloropyrazine (44 μL, 0.50 mmol, 1 equiv), 3,4,5-trifluorophenyl-boronic acid (132 mg, 0.75 mmol, 1.5 equiv), and K$_3$PO$_4$.5H$_2$O (0.45 g, 1.5 mmol, 3 equiv) was added THF (400 μL) then a THF stock solution of 3 and PAd$_3$ (100 μL, 0.25 μmol of Pd/PAd$_3$). The mixture was stirred at 70° C. for 5 h. The reaction mixture was diluted with ethyl acetate then extracted with water. The combine organic layers were evaporated and the crude product was purified by flash chromatography. After drying, 77 mg (73%) of 31 was obtained as a white solid.

$^1$H NMR (501 MHz, CDCl$_3$) δ 8.98 (d, J=1.6 Hz, 1H), 8.66-8.62 (m, 1H), 8.57 (d, J=2.5 Hz, 1H), 7.75-7.65 (m, 2H).

$^{13}$C{$^1$H} NMR (126 MHz, CDCl$_3$) δ 151.7 (ddd, J=250.7, 10.2, 4.0 Hz), 149.4 (dt, J=1.3, 2.5 Hz), 144.3, 144.0, 141.6, 140.9 (dt, J=255.8, 15.4 Hz), 132.3 (dt, J=5.0, 7.6 Hz), 111.0 (dd, J=17.1, 5.5 Hz).

HRMS (ESI) m/z calculated for C$_{10}$H$_5$F$_3$N$_2$ (M+1) 211.0478, found 211.0471.

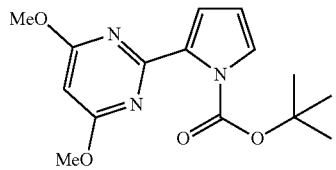
(32)

To a mixture of 2-chloropyrazine (44 μL, 0.50 mmol, 1 equiv), (6-methoxypyridin-3-yl)boronic acid (115 mg, 0.75 mmol, 1.5equiv), and K$_3$PO$_4$.5H$_2$O (0.45 g, 1.5 mmol, 3.0 equiv) was added THF (400 μL) then a THF stock solution of 3 and PAd$_3$ (100 μL, 0.25 μmol of Pd/PAd$_3$). The mixture was stirred at 70° C. for 5 h. The reaction mixture was diluted with ethyl acetate then extracted with water. The combine organic layers were evaporated and the crude product was purified by flash chromatography. After drying, 77 mg (82%) of 32 was obtained as a white solid.

$^1$H NMR (501 MHz, CDCl$_3$) δ 8.89 (d, J=1.6 Hz, 1H), 8.72 (d, J=2.6 Hz, 1H), 8.54-8.49 (m, 1H), 8.41 (d, J=2.6 Hz, 1H), 8.15 (dd, J=8.7, 2.5 Hz, 1H), 6.79 (d, J=8.7 Hz, 1H), 3.92 (s, 3H).

$^{13}$C{$^1$H} NMR (126 MHz, CDCl$_3$) δ 165.2, 150.6, 145.7, 144.2, 142.8, 141.3, 137.1, 125.6, 111.4, 53.8.

HRMS (ESI) m/z calculated for C$_{10}$H$_9$N$_3$O (M+1) 118.0818, found 118.0814.

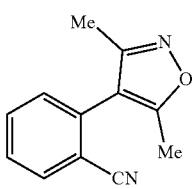
(33)

To a mixture of 2-chloro-4,6-dimethoxypyrimidine (87 mg, 0.50 mmol, 1 equiv), N-Boc-2-pyrroleboronic acid (116 mg, 0.55 mmol, 1.1 equiv), and K$_3$PO$_4$.5H$_2$O (0.33 g, 1.1 mmol, 2.2 equiv) was added n-butanol (400 μL) then a THF stock solution of 3 and PAd$_3$ (100 μL, 0.25 μmol of Pd/PAd$_3$). The mixture was stirred at room temperature for 5 h. The reaction mixture was diluted with ethyl acetate then extracted with water. The combine organic layers were evaporated and the crude product was purified by flash chromatography. After drying, 147 mg (96%) of 33 was obtained as a colorless oil.

$^1$H NMR (501 MHz, CDCl$_3$) δ 7.33 (dd, J=3.1, 1.7 Hz, 1H), 6.77 (dd, J=3.4, 1.7 Hz, 1H), 6.26 (t, J=3.3 Hz, 1H), 5.95 (s, 1H), 3.97 (s, 6H), 1.48 (s, 9H).

$^{13}$C{$^1$H} NMR (126 MHz, CDCl$_3$) δ 171.0, 159.4, 149.0, 133.0, 124.8, 117.9, 110.5, 87.6, 83.6, 54.0, 27.7.

HRMS (ESI) m/z calculated for C$_{15}$H$_{19}$N$_3$O$_4$ (M+1) 306.1448, found 306.1431.

(34)

To a mixture of 2-chlorobenzonitrile (69 mg, 0.50 mmol, 1 equiv), (3,5-dimethylisoxazol-4-yl)boronic acid (106 mg, 0.75 mmol, 1.5 equiv), and K$_3$PO$_4$.5H$_2$O (0.45 g, 1.5 mmol, 3 equiv) was added THF (400 µL) then a THF stock solution of 3 and PAd$_3$ (100 µL, 0.25 µmol of Pd/PAd$_3$). The mixture was stirred at 100° C. for 9 h. The reaction mixture was diluted with ethyl acetate then extracted with water. The combine organic layers were evaporated and the crude product was purified by flash chromatography. After drying, 78 mg (79%) of 34 was obtained as a colorless oil. NMR spectroscopic data agreed with literature values.

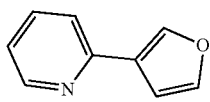
(35)

To a mixture of 2-chloropyridine (47 µL, 0.50 mmol, 1 equiv), furan-3-ylboronic acid (84 mg, 0.75 mmol, 1.5 equiv), and K$_3$PO$_4$.H$_2$O (0.35 g, 1.5 mmol, 3 equiv) was added THF (400 µL) then a THF stock solution of 3 and PAd$_3$ (100 µL, 0.25 µmol of Pd/PAd$_3$). The mixture was stirred at 100° C. for 12 h. The reaction mixture was diluted with ethyl acetate then extracted with water. The combine organic layers were evaporated and the crude product was purified by flash chromatography. After drying, 80 mg (92%) of 35 was obtained as a colorless oil. NMR spectroscopic data agreed with literature values.

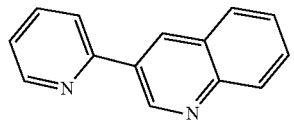
(36)

To a mixture of 2-chloropyridine (47 µL, 0.50 mmol, 1 equiv), quinolin-3-ylboronic acid (130 mg, 0.75 mmol, 1.5 equiv), and K$_3$PO$_4$.H$_2$O (0.35 g, 1.5 mmol, 3 equiv) was added n-butanol (400 µL) then a THF stock solution of 3 and PAd$_3$ (100 µL, 0.25 µmol of Pd/PAd$_3$). The mixture was stirred at 100° C. for 5 h. The reaction mixture was diluted with ethyl acetate then extracted with water. The combine organic layers were evaporated and the crude product was purified by flash chromatography. After drying, 83 mg (80%) of 36 was obtained as a white solid. NMR spectroscopic data agreed with literature values.

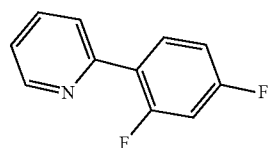
(37)

To a mixture of 2-chloropyridine (47 µL, 0.50 mmol, 1 equiv), 2,4-difluorophenylboronic acid (118 mg, 0.75 mmol, 1.5 equiv), and K$_3$PO$_4$.5H$_2$O (0.45 mg, 1.5 mmol, 3 equiv) was added THF (400 µL) then a THF stock solution of 3 and PAd$_3$ (100 µL, 0.25 µmol of Pd/PAd$_3$). The mixture was stirred at 70° C. for 4 h. The reaction mixture was diluted with ethyl acetate then extracted with water. The combine organic layers were evaporated and the crude product was purified by flash chromatography. After drying, 89 mg (93%) of 37 was obtained as a colorless oil. NMR spectroscopic data agreed with literature values.

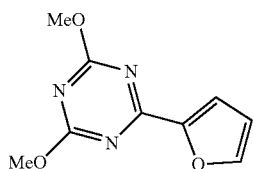
(38)

To a mixture of 2-chloro-4,6-dimethoxy-1,3,5-triazine (88 mg, 0.50 mmol, 1 equiv), furan-2-ylboronic acid (84 mg, 0.75 mmol, 1.5 equiv), and K$_3$PO$_4$.5H$_2$O (0.45 mg, 1.5 mmol, 3 equiv) was added THF (400 µL) then a THF stock solution of 3 and PAd$_3$ (100 µL, 0.25 µmol of Pd/PAd$_3$). The mixture was stirred at room temperature for 1.5 h. The reaction mixture was diluted with ethyl acetate then extracted with water. The combine organic layers were evaporated and the crude product was purified by flash chromatography. After drying, 93 mg (90%) of 38 was obtained as a white solid.

$^1$H NMR (501 MHz, CDCl$_3$) δ 7.64-7.59 (m, 1H), 7.44 (d, J=3.5 Hz, 1H), 6.53 (dd, J=3.4, 1.7 Hz, 1H), 4.03 (s, 6H).
$^{13}$C{$^1$H} NMR (126 MHz, CDCl$_3$) δ 172.6, 166.5, 150.1, 146.6, 117.4, 112.5, 55.2.
HRMS (ESI) m/z calculated for C$_9$H$_9$N$_3$O$_3$ (M+1) 208.0717, found 208.0706.

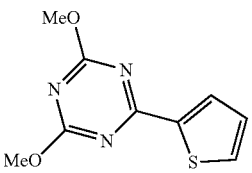
(39)

To a mixture of 2-chloro-4,6-dimethoxy-1,3,5-triazine (88 mg, 0.50 mmol, 1 equiv), thiophen-2-ylboronic acid (96 mg, 0.75 mmol, 1.5 equiv), and K$_3$PO$_4$.5H$_2$O (0.45 mg, 1.5 mmol, 3 equiv) was added THF (400 µL) then a THF stock solution of 3 and PAd$_3$ (100 µL, 0.25 µmol of Pd/PAd$_3$). The mixture was stirred at room temperature for 5 h. The reaction mixture was diluted with ethyl acetate then extracted with water. The combine organic layers were evaporated and the crude product was purified by flash chromatography. After drying, 104 mg (93%) of 39 was obtained as a white solid. NMR spectroscopic data agreed with literature values.

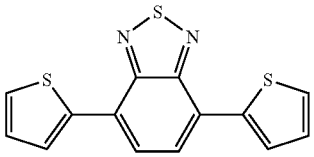
(40)

To a mixture of 4,7-dibromobenzo[c][1,2,5]thiadiazole (147 mg, 0.50 mmol, 1 equiv), thiophen-2-ylboronic acid (192 mg, 1.50 mmol, 3 equiv), and K$_3$PO$_4$.5H$_2$O (0.90 g, 3.0 mmol, 6 equiv) was added THF (900 µL) then a THF stock solution of 3 and PAd₃ (100 μL, 0.25 μmol of Pd/PAd₃). The mixture was stirred at room temperature for 1 h. The reaction mixture was diluted with ethyl acetate then extracted with water. The combine organic layers were evaporated and the crude product was purified by flash chromatography. After drying, 143 mg (95%) of 40 was obtained as an orange solid. NMR spectroscopic data agreed with literature values.

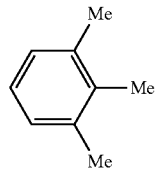

(41)

To a mixture of 2-chloro-1,3-dimethylbenzene (66 μL, 0.50 mmol, 1 equiv), methylboronic acid (45 mg, 0.75 mmol, 1.5 equiv), 1,3,5-trimethyoxybenzene (84 mg, 0.50 mmol, 1 equiv) as internal standard, and K₃PO₄.5H₂O (0.45 g, 1.5 mmol, 3 equiv) was added THF (400 μL) then a THF stock solution of 3 and PAd₃ (100 μL, 0.25 μmol of Pd/PAd₃). The mixture was stirred at 50° C. for 5 h. The crude NMR yield was 90% versus the internal standard. The reaction mixture was diluted with ethyl acetate then extracted with water. The combine organic layers were evaporated and the crude product was purified by flash chromatography. After drying, 30 mg (50%) of 41 was obtained as a colorless oil.

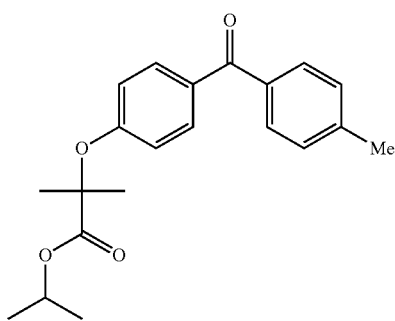

(42)

To a mixture of fenofibrate (90 mg, 0.25 mmol, 1 equiv), methylboronic acid (30 mg, 0.50 mmol, 2 equiv), 1,3,5-trimethyoxybenzene (42 mg, 0.25 mmol, 1 equiv) as internal standard, and K₃PO₄.H₂O (0.18 g, 0.75 mmol, 3 equiv) was added toluene (400 μL) then a THF stock solution of 3 and PAd₃ (50 μL, 0.125 μmol of Pd/PAd₃). The mixture was stirred at 100° C. for 5 h. The crude NMR yield was 88% versus internal standard. The reaction mixture was diluted with ethyl acetate then extracted with water. The combine organic layers were evaporated and the crude product was purified by flash chromatography and preparative HPLC. After drying, 65 mg (76%) of 42 was obtained as a white solid.

¹H NMR (501 MHz, CDCl₃) δ 7.80-7.73 (m, 2H), 7.71-7.65 (m, 2H), 7.28 (d, J=7.9 Hz, 2H), 6.92-6.84 (m, 2H), 5.10 (hept, J=6.3 Hz, 1H), 2.44 (s, 3H), 1.67 (s, 6H), 1.22 (d, J=6.3 Hz, 6H).

¹³C{¹H} NMR (126 MHz, CDCl₃) δ 195.3, 173.2, 159.3, 142.7, 135.4, 131.9, 130.9, 130.0, 128.9, 117.1, 79.3, 69.3, 25.4, 21.6, 21.5.

HRMS (ESI) m/z calculated for $C_{21}H_{24}O_4$ (M+1) 341.1747, found 341.1749.

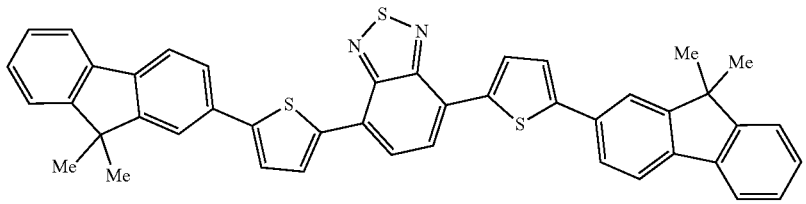

(43)

To a mixture of 4,7-bis(5-bromothiophen-2-yl)benzo[c][1,2,5]thiadiazole (115 mg, 0.25 mmol, 1 equiv),[29] (9,9-dimethyl-9H-fluoren-2-yl)boronic acid (131 mg, 0.55 mmol, 2.2 equiv), and K₃PO₄.5H₂O (0.33 g, 1.1 mmol, 4.4 equiv) was added THF (900 μL) then a THF stock solution of 3 and PAd₃ (100 μL, 0.25 μmol of Pd/PAd₃). The mixture was stirred at room temperature for 1 h. The reaction mixture was diluted with ethyl acetate then extracted with water. The combine organic layers were evaporated and the crude product was purified by flash chromatography. After drying, 152 mg (89%) of 43 was obtained as a dark red solid.

¹H NMR (501 MHz, CDCl₃) δ 8.19 (d, J=3.9 Hz, 2H), 7.97 (s, 2H), 7.82-7.72 (m, 8H), 7.54-7.46 (m, 4H), 7.38 (pd, J=7.4, 1.5 Hz, 4H), 1.59 (s, 12H).

¹³C{¹H} NMR (126 MHz, CDCl₃) δ 154.4, 153.9, 152.7, 146.3, 139.2, 138.7, 138.4, 133.2, 128.6, 127.5, 127.1, 125.8, 125.3, 125.0, 124.0, 122.7, 120.5, 120.1, 120.1, 47.0, 27.2.

HRMS (ESI) m/z calculated for $C_{44}H_{33}N_2S_3$ (M+1) 685.1800, found 685.1782.

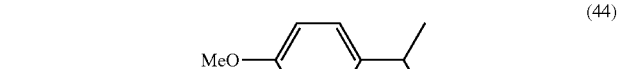

(44)

To a mixture of 4-chloroanisole (62 μL, 0.50 mmol, 1 equiv), isopropylboronic acid (66 mg, 0.75 mmol, 1.5 equiv), and K₃PO₄.H₂O (0.35 mg, 1.5 mmol, 3 equiv) was added a toluene stock solution of 3 and PAd₃ (2 mL, 5 μmol of Pd/PAd₃). The mixture was stirred at 100° C. for 5 h. The reaction mixture was diluted with ethyl acetate then extracted with water. The combine organic layers were evaporated and the crude product was purified by flash chromatography. After drying, 53 mg (70%) of 44 was obtained as a colorless oil. NMR spectroscopic data agreed with literature values.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of synthesizing a tri-(adamantyl)phosphine compound, $PAd_3$, comprising:
   providing a mixture comprising di-1-adamantylphosphine and 1-adamantylacetate in a solvent; and
   adding $Me_3SiOTf$ to the mixture resulting in the production of the $PAd_3$.

2. The method of claim 1, wherein yield of the $PAd_3$ is greater than 50 percent.

3. The method of claim 1, wherein yield of the $PAd_3$ is greater than 60 percent.

4. The method of claim 1, wherein synthesizing the $PAd_3$ is performed at room temperature.

* * * * *